United States Patent
Adolph et al.

(10) Patent No.: US 7,924,916 B2
(45) Date of Patent: Apr. 12, 2011

(54) METHOD AND APPARATUS FOR DECODING ENCODED GROUPS OF PICTURES OF A VIDEO SEQUENCE AND PRESENTING SAID VIDEO SEQUENCE AND SAID GROUPS OF PICTURES IN TEMPORALLY BACKWARD DIRECTION

(75) Inventors: Dirk Adolph, Ronnenberg (DE); Carsten Herpel, Wennigsen (DE); Jobst Hörentrup, Hannover (DE); Uwe Janssen, Seelze (DE); Ralf Ostermann, Hannover (DE); Hartmut Peters, Barsinghausen (DE); Andrej Schewzow, Hannover (DE); Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1428 days.

(21) Appl. No.: 11/211,772

(22) Filed: Aug. 25, 2005

(65) Prior Publication Data

US 2006/0045491 A1 Mar. 2, 2006

(30) Foreign Application Priority Data

Sep. 2, 2004 (EP) .................................. 04090338

(51) Int. Cl.
*H04N 7/12* (2006.01)
(52) U.S. Cl. ......... 375/240.12; 375/240.11; 375/240.13; 375/240.14; 375/240.25; 375/240.26

(58) Field of Classification Search ........... 375/240.11–240.14, 240.25, 240.26
See application file for complete search history.

(56) References Cited

U.S. PATENT DOCUMENTS

| 5,974,224 A | 10/1999 | Nagata |
| 6,353,700 B1 | 3/2002 | Zhou |
| 6,751,400 B1 | 6/2004 | Matsumura et al. |
| 2003/0103566 A1 | 6/2003 | Stenzel |

FOREIGN PATENT DOCUMENTS

WO WO 03/046892 A2 6/2003

OTHER PUBLICATIONS

European Search Report.

*Primary Examiner* — Joseph G Ustaris
*Assistant Examiner* — Geepy Pe
(74) *Attorney, Agent, or Firm* — Robert D. Shedd; Paul P. Kiel; Guy H. Eriksen

(57) ABSTRACT

MPEG video uses motion compensated prediction for coding pictures. A GOP includes at least one intra-coded picture to start decoding with and a number of inter-coded pictures and normally also includes bi-directionally predicted pictures. However, the GOP structure is not constructed for playing GOPs in backward direction in a trickplay mode across GOP boarders. The invention facilitates, for different GOP structures, a smooth backward video mode thereby reducing the required number of frame buffers and achieving near real-time speed presentation. In some embodiments some I and/or P pictures are decoded more than once. The invention also allows backwards decoding of MPEG-4-AVC GOPs including B-stored pictures.

6 Claims, 14 Drawing Sheets

METHOD AND APPARATUS FOR DECODING ENCODED GROUPS OF PICTURES OF A VIDEO SEQUENCE AND PRESENTING SAID VIDEO SEQUENCE AND SAID GROUPS OF PICTURES IN TEMPORALLY BACKWARD DIRECTION

This application claims the benefit, under 35 U.S.C. §119 of European Patent Application 04090338.7, filed Sep. 2, 2004.

FIELD OF THE INVENTION

The invention relates to a method and to an apparatus for decoding encoded groups of pictures of a video sequence and presenting the video sequence and the groups of pictures in temporally backward direction.

BACKGROUND OF THE INVENTION

MPEG encoded video is a worldwide format for digital video storage and retrieval. It uses motion compensated prediction for information reduction thereby generating inter-coded pictures which are predicted from other previously decoded pictures. Such previously generated pictures may be intra-coded if they can be decoded on their own, or may be inter-coded. For providing some random access into an encoded video bitstream, a number of intra- and inter-encoded pictures are in each case arranged as a group of pictures (GOP). A GOP includes at least one intra-coded picture to start decoding with and a varying number of other intra- or mostly inter-coded pictures. The inter-coded pictures normally also include bi-directionally predicted pictures. The GOP structure is chosen such that an optimisation for coding efficiency is achieved while keeping a feature of seamless entrance within the video bitstream, i.e. there will be no losses in the video quality when playback is started with any GOP.

However, this scenario changes if video trickplay is requested. This is true in particular for decoding in a backward play mode. Playing in backward direction (i.e. in a trickplay mode) means displaying the pictures of a GOP in reverse order and across GOP boarders. That is a requirement the GOP structure is not constructed for when motion compensated prediction was used in the (forward) encoding.

Two different techniques for backward mode decoding are known. The first one in general performs temporal sub-sampling of the pictures. The bi-directionally predicted B-pictures are skipped due to missing frame memory capacity, and for larger GOP lengths even the P-pictures at the end of the GOPs are not decoded or are left out during reverse playback. Both sub-techniques are resulting in a jerky video movement and thus picture quality degradation.

The other prior art technique is a very-slow backward mode (single-step mode) in which each picture of a GOP is decoded and presented in reverse order. This is achieved by repeatedly decoding a current GOP from its beginning until the next target picture in reverse order is reached. Such processing is much slower than the original speed and thus generates some kind of slide show effect.

SUMMARY OF THE INVENTION

A problem to be solved by the invention is to provide a smooth backward video mode, thereby reducing the required number of frame buffers and achieving near real-time speed presentation.

The invention facilitates, for different GOP structures, a smooth backward video replay of all types of MPEG picture sequences like MPEG-1 (ISO/IEC 11172-2), MPEG-2 (ISO/IEC 13818-2) and MPEG-4 (ISO/IEC 14496) Video, by tricky changes in the frame decoding sequence whereby less frame buffers are used and in some embodiments some I and/or P pictures are decoded more than once. The invention also allows backwards decoding of GOP structures as defined for the advanced video codec of MPEG-4-AVC (ISO/IEC 14496-10 Advanced Video Coding), in which the GOP structure can include a further anchor frame hierarchy by using bi-directionally predicted pictures, called B-stored pictures 'Bs' (parameter nal_ref_idc is not equal zero), as an anchor frame. When using a B-picture as an anchor frame it is to be stored into, and kept in, a frame buffer and cannot be decoded directly (i.e. on-the-fly, without temporary picture storage) for display only. Otherwise a B-picture could not be used for the prediction of further inter-coded pictures. The B-stored picture in MPEG-4 is an extension to MPEG-2 where only intra-coded or unidirectionally predicted inter-coded pictures (I and P pictures) are used for anchor frames.

For the different GOP structures the invention discloses a generally applicable way of generating a smoother backward mode taking into account memory capacity limitations. This is a particular advantage if large GOP sizes are to be processed.

In principle, the inventive method is suited for: decoding encoded groups of pictures denoted GOP of a video sequence and presenting or displaying said video sequence and said GOPs in temporally backward direction, wherein each GOP includes anchor pictures serving for prediction of other pictures and interspersed non-anchor pictures not serving for prediction of other pictures, and wherein decoding of a current one of said GOPs starts with decoding anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said method including the steps:

initially storing only a group of last decoded anchor pictures of the first GOP in dedicated picture buffers and starting presentation or display of said current GOP using said initially stored decoded anchor pictures and the corresponding interspersed non-anchor pictures, wherein the total number of such dedicated picture buffers is less than the total number of anchor pictures per GOP;

continuing, until arrival at the beginning of said current GOP, the presentation or display of the remaining pictures of said current GOP using remaining ones of decoded anchor pictures intermediately stored in said dedicated picture buffers and using the corresponding interspersed non-anchor pictures, thereby repeating at least once the presentation or display of at least N of said decoded anchor pictures of said current GOP, in order to make available decoding processing time for repeatedly decoding anchor pictures of said current GOP which do not belong to said group of last decoded anchor pictures of said current GOP, and in order to avoid repeating N times presentation or display of one of said decoded anchor pictures, wherein N is an integer greater than 1, and wherein said presentation or display of a current GOP is carried out such that when finalising it the corresponding decoded anchor pictures for the following GOP to be presented or displayed are again stored in said dedicated picture buffers,
or for:
decoding encoded groups of pictures denoted GOP of a video sequence and presenting or displaying said video sequence and said GOPs in temporally backward direction,
wherein each GOP includes anchor pictures serving for prediction of other pictures and interspersed non-anchor pictures not serving for prediction of other pictures,
and wherein decoding of a current one of said GOPs starts with decoding anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said method including the steps:

initially storing only a group of last decoded anchor pictures of the first GOP in dedicated picture buffers and starting presentation or display of said current GOP using said initially stored decoded anchor pictures and the corresponding interspersed non-anchor pictures, wherein the total number of such dedicated picture buffers is less than the total number of anchor pictures per GOP, and wherein a specific one of said decoded anchor pictures of said current GOP is intermediately stored in a dedicated picture buffer, said specific anchor picture being located at a position in GOP display time that is one half or about one half of the time period between the start of the current GOP and said group of last decoded anchor pictures, and said specific anchor picture facilitating re-start of decoding of anchor pictures of the GOP from that position instead of from the very beginning of the GOP;

continuing, until arrival at the beginning of said current GOP, the presentation or display of the remaining pictures of said current GOP using remaining ones of decoded anchor pictures intermediately stored in said dedicated picture buffers and using the corresponding interspersed non-anchor pictures, thereby repeating at least once the presentation or display of at least two of said decoded anchor pictures of said current GOP, in order to make available decoding processing time for repeatedly decoding those anchor pictures of said current GOP which do not belong to said group of last decoded anchor pictures of said current group of picture, and wherein said presentation or display of a current GOP is carried out such that when finalising it the corresponding decoded anchor pictures for the following GOP to be presented or displayed are again stored in said dedicated picture buffers,
or for:
decoding encoded groups of pictures denoted GOP of a video sequence and presenting or displaying said video sequence and said GOPs in temporally backward direction,
wherein each GOP includes anchor pictures serving for prediction of other pictures and interspersed non-anchor pictures not serving for prediction of other pictures, and
wherein said GOP is an MPEG broken-link GOP not starting with an anchor picture but starting with at least one non-anchor picture,
and wherein decoding of a current one of said GOPs starts with decoding the anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said method including the steps:

initially storing the decoded anchor pictures of the first GOP in dedicated picture buffers;

presenting or displaying a current GOP using said stored decoded anchor pictures and the corresponding interspersed non-anchor pictures, wherein said presentation or display of said current GOP is carried out such that, before finalising the presentation or display of an anchor picture of the current GOP, an anchor picture of the following GOP to be processed has been decoded and stored in one of said dedicated picture buffers, starting with the first anchor picture of the following GOP and ending with the last anchor picture of the following GOP.

In principle the inventive apparatus is suited for: decoding encoded groups of pictures denoted GOP of a video sequence and presenting or displaying said video sequence and said GOPs in temporally backward direction,
wherein each GOP includes anchor pictures serving for prediction of other pictures and interspersed non-anchor pictures not serving for prediction of other pictures,
and wherein decoding of a current one of said GOPs starts with decoding anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said apparatus including means being adapted for:

initially storing only a group of last decoded anchor pictures of the first GOP in dedicated picture buffers and starting presentation or display of said current GOP using said initially stored decoded anchor pictures and the corresponding interspersed non-anchor pictures, wherein the total number of such dedicated picture buffers is less than the total number of anchor pictures per GOP;

continuing, until arrival at the beginning of said current GOP, the presentation or display of the remaining pictures of said current GOP using remaining ones of decoded anchor pictures intermediately stored in said dedicated picture buffers and using the corresponding interspersed non-anchor pictures, thereby repeating at least once the presentation or display of at least N of said decoded anchor pictures of said current GOP, in order to make available decoding processing time for repeatedly decoding anchor pictures of said current GOP which do not belong to said group of last decoded anchor pictures of said current GOP, and in order to avoid repeating N times presentation or display of one of said decoded anchor pictures, wherein N is an integer greater than 1, and wherein said presentation or display of a current GOP is carried out such that when finalising it the corresponding decoded anchor pictures for the following GOP to be presented or displayed are again stored in said dedicated picture buffers;
or for:
decoding encoded groups of pictures denoted GOP of a video sequence and presenting or displaying said video sequence and said GOPs in temporally backward direction,
wherein each GOP includes anchor pictures serving for prediction of other pictures and interspersed non-anchor pictures not serving for prediction of other pictures, and wherein decoding of a current one of said GOPs starts with decoding anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said apparatus including means being adapted for:

initially storing only a group of last decoded anchor pictures of the first GOP in dedicated picture buffers and starting presentation or display of said current GOP using said initially stored decoded anchor pictures and the corresponding interspersed non-anchor pictures, wherein the total number of such dedicated picture buffers is less than the total number of anchor pictures per GOP, and wherein a specific one of said decoded anchor pictures of said current GOP is intermediately stored in a dedicated picture buffer, said specific anchor picture being located at a position in GOP display time that is one half or about one half of the time period between the start of the current GOP and said group of last decoded anchor pictures, and said specific anchor picture facilitating re-start of decoding of anchor pictures of the GOP from that position instead of from the very beginning of the GOP;

continuing, until arrival at the beginning of said current GOP, the presentation or display of the remaining pictures of said current GOP using remaining ones of decoded anchor pictures intermediately stored in said dedicated picture buffers and using the corresponding interspersed non-anchor pictures, thereby repeating at least once the presentation or display of at least two of said decoded anchor pictures of said current GOP, in order to make available decoding processing time for repeatedly decoding those anchor pictures of said current GOP which do not belong to said group of last decoded anchor pictures of said current group of picture, and wherein said presentation or display of a current GOP is carried out such that when finalising it the corresponding decoded anchor pictures for the following GOP to be presented or displayed are again stored in said dedicated picture buffers, or for:

decoding encoded groups of pictures denoted GOP of a video sequence and presenting or displaying said video sequence and said GOPs in temporally backward direction, wherein each GOP includes anchor pictures serving for prediction of other pictures and interspersed non-anchor pictures not serving for prediction of other pictures, and wherein said GOP is an MPEG broken-link GOP not starting with an anchor picture but starting with at least one non-anchor picture, and wherein decoding of a current one of said GOPs starts with decoding the anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said apparatus including means being adapted for:

initially storing the decoded anchor pictures of the first GOP in dedicated picture buffers;

presenting or displaying a current GOP using said stored decoded anchor pictures and the corresponding interspersed non-anchor pictures, wherein said presentation or display of said current GOP is carried out such that, before finalising the presentation or display of an anchor picture of the current GOP, an anchor picture of the following GOP to be processed has been decoded and stored in one of said dedicated picture buffers, starting with the first anchor picture of the following GOP and ending with the last anchor picture of the following GOP.

BRIEF DESCRIPTION OF THE DRAWINGS

Exemplary embodiments of the invention are described with reference to the accompanying drawings, which show in:

FIG. 12 backwards decoding and reverse playback of long MPEG-4 B-stored GOP structures using the same number of frame buffers than in FIG. 11a.

DETAILED DESCRIPTION OF PREFERRED EMBODIMENTS

Figure 1:
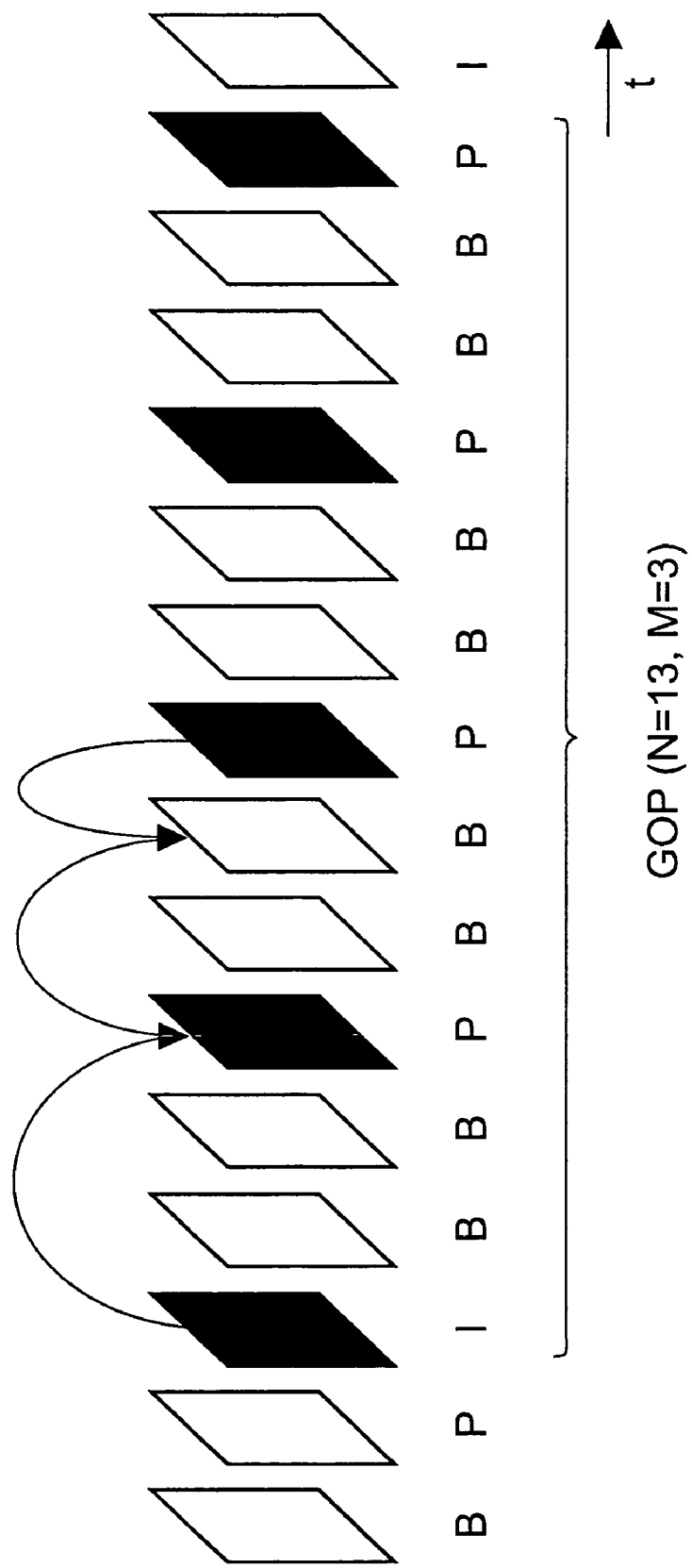
FIG. 1 a standard MPEG-2 GOP structure.

FIG. 1 shows a standard MPEG-2 GOP structure. It is a closed GOP as is apparent when comparing it to FIG. 2. A closed GOP can be decoded on its own without using data from external anchor frames. The GOP structure can vary but must include at least one I-picture or I-frame to start the decoding in direction of the time axis t. An I-picture is an intra-coded picture which can be decoded without using data from other pictures. The P-pictures or P-frames are inter-coded which means that they are motion compensated (temporally) predicted from a previous decoded anchor frame. In MPEG-2 anchor frames always are I- or P-pictures. The B-pictures are bi-directionally motion compensated (temporally) predicted from a past and a future anchor frame. The depicted GOP contains N=13 pictures in which the anchor frame distance is M=3.

Figure 2:
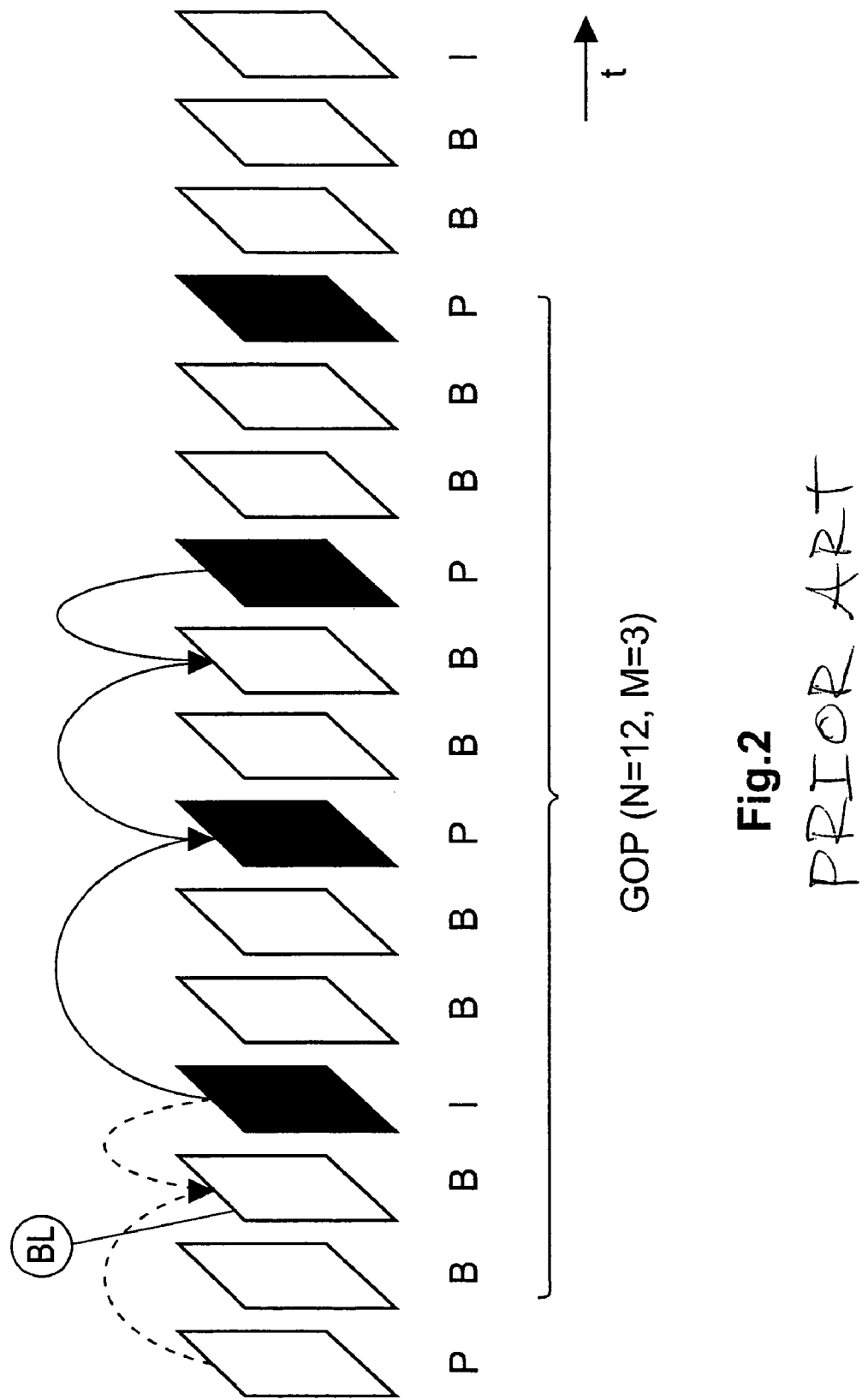
FIG. 2 an MPEG-2 GOP structure with two preceding B-pictures in front of the first I-picture.

FIG. 2 shows an MPEG-2 GOP structure in which the first I-picture to be decoded is preceded by two B-pictures. This kind of GOP structure is called a 'broken link GOP' because for decoding of the two preceding B-pictures data from another GOP is needed, more exactly: the last anchor frame of the previous GOP must have been decoded before. A disadvantage of broken link GOPs is that backwards decoding is more difficult. The depicted GOP contains N=12 pictures in which the anchor frame distance is M=3.

Figure 3:
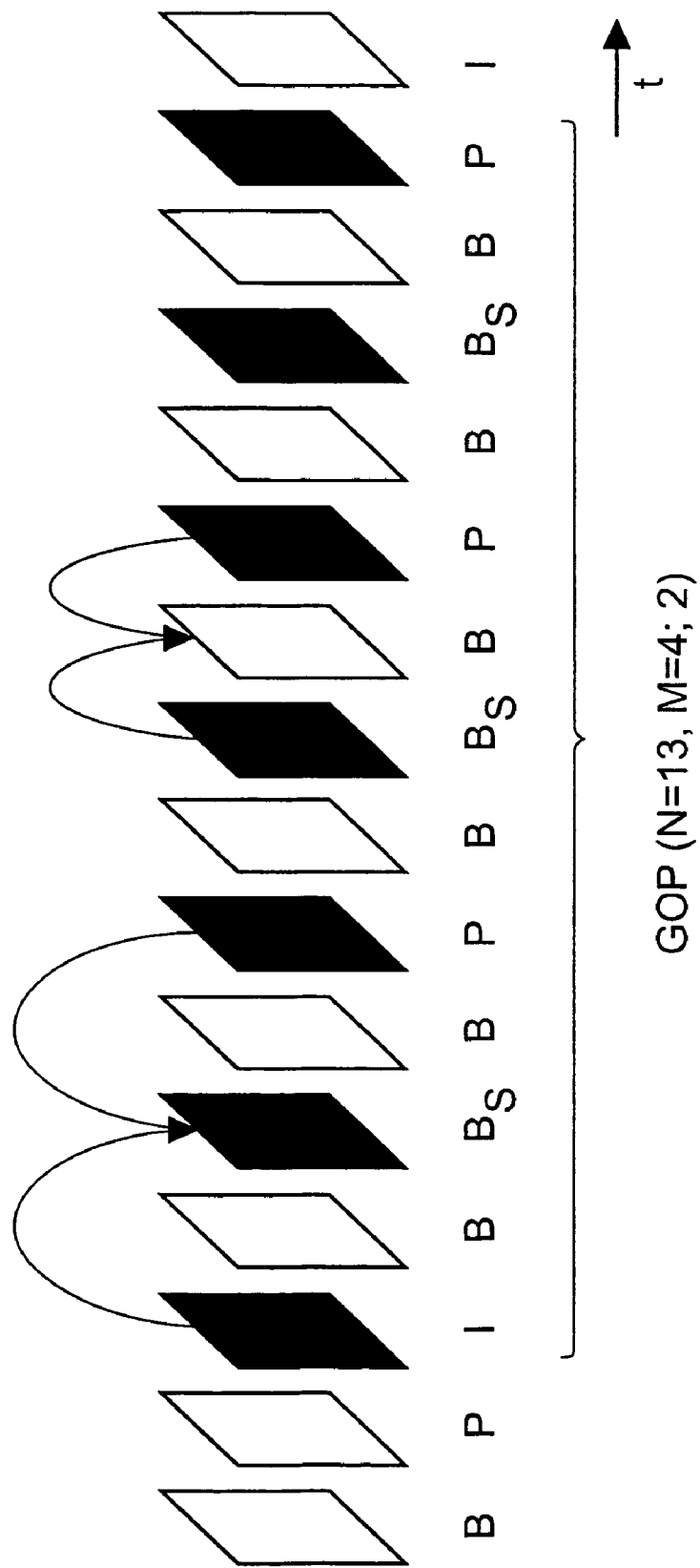
FIG. 3 an MPEG-4 AVC GOP structure including B-stored pictures.

FIG. 3 shows an MPEG-4 AVC GOP structure including B-stored pictures $B_s$. In contrast to normal B-pictures, B-stored picture can be used for further prediction of other pictures, i.e. a B-stored picture can be an anchor frame. The term 'stored' points to the fact that an anchor frame must be kept in memory to allow for the execution of motion compensated prediction and reconstruction of other pictures, whereas a B-frame is only decoded for direct display and its decoded data are thrown away upon display. In MPEG, this B-frame on-the-fly decoding has been developed to save frame memory. In the embodiments described in connection with FIG. 10 to 12 the B-stored pictures are used for B-picture prediction only and not for P-picture prediction.

Figure 4:
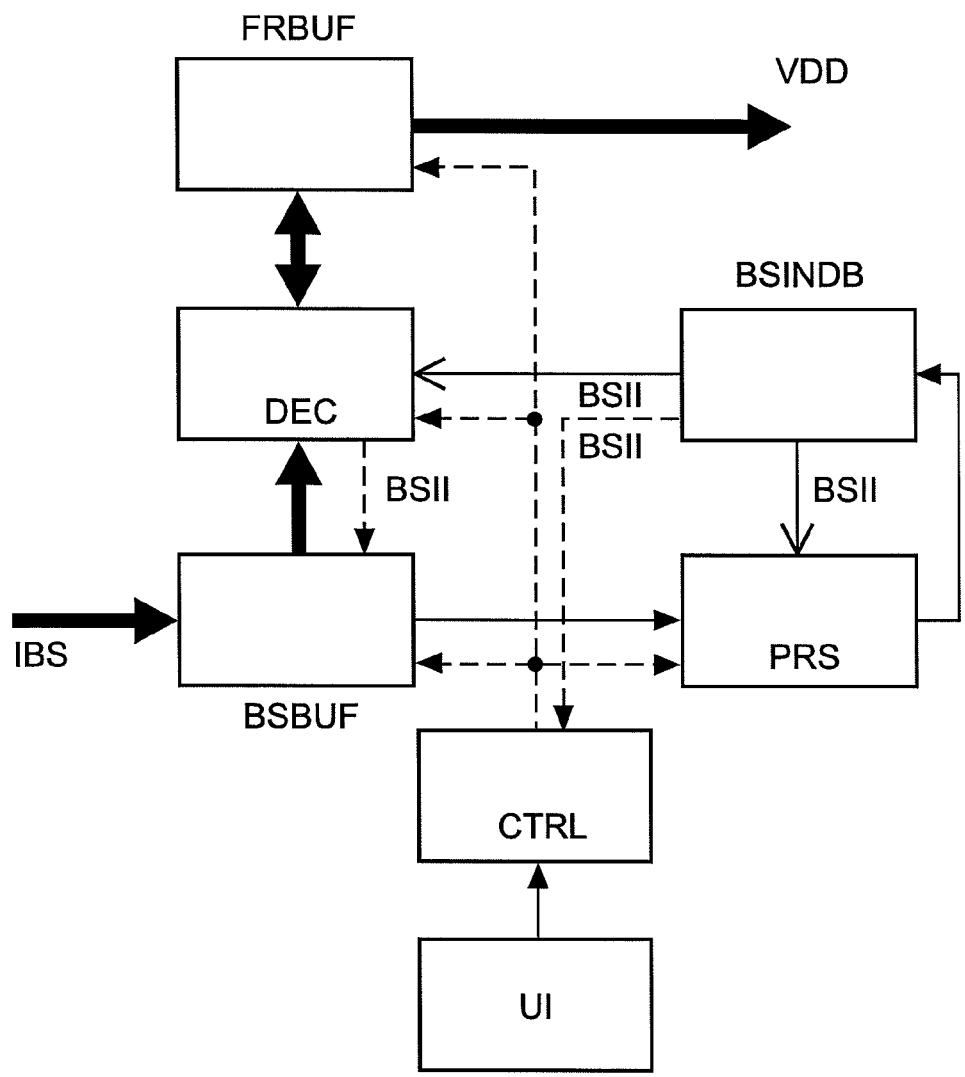
FIG. 4 block diagram of an MPEG decoder making use of the invention.

In the block diagram in FIG. 4 the main parts of an MPEG decoder are shown, which are used for implementing the invention. The incoming bitstream IBS is stored within a bitstream buffer BSBUF. Those parts of the bitstream in buffer BSBUF, for which the decoding processing has been finalised, are removed from buffer BSBUF. The bitstream buffer BSBUF is accessed from a decoder DEC and from a parser PRS. The parser is analysing the bitstream and generates corresponding indices which are stored within a bitstream index buffer BSINDB which outputs requested bitstream index information items BSII. "Parsing a bitstream" means analysing current picture type data (e.g. Bs-picture) and their current location (picture begin and end byte positions) within bitstream buffer BSBUF. In operation, parser PRS has access to previously stored bitstream index information items BSII in BSINDB. Decoder DEC takes bitstream index information items BSII from buffer BSINDB to execute decoding of the bitstream out of the bitstream buffer BSBUF. The decoded or reconstructed picture data which represent anchor frames are stored in corresponding frame buffers FRBUF which, during suitable time periods, will output corresponding video display data VDD, i.e. decoded pictures to be displayed. The bitstream buffer-stored picture data which do not represent anchor frames (in particular B frame data) are decoded or reconstructed on-the-fly and are output directly or via the frame buffers as corresponding video display data VDD. As an alternative, the decoded B picture data can be temporally stored in a frame buffer if available, but that storage is carried out e.g. half a frame in advance before display.

If necessary, decoder DEC also receives corresponding anchor frame data from the frame buffers FRBUF for performing motion compensated prediction. In case of B picture decoding this can be done on-the-fly i.e. only part, for example one MPEG slice, of data for a picture is buffered and output as video display data to a display device (not depicted). The on-the-fly decoded picture data is dropped after being displayed. All processing is controlled by a controller CTRL, in which decoding or display parameters can be set or changed by a user interface UI. The required bitstream index information items BSII (picture begin and end byte positions, picture type data) from buffer BSINDB are either passed via decoder DEC to bitstream buffer BSBUF, or are received by controller CTRL and passed to bitstream buffer BSBUF.

The bold connection lines represent the bitstream data decoding flow. The normal connection lines with bold arrows represent the generation of mean data. The normal connection lines with normal arrows represent the reading of mean data. The broken connection lines with bold arrows represent control paths.

FIGS. 5 to 12 deal with backwards decoding of a picture sequence. For FIGS. 5 to 12 the following general remarks are valid. At the top of these figures the GOP structure under study is depicted in forward display order time direction $t_F$ and in bitstream order each. Below, the frame buffers and code buffers used are depicted, to each of which a buffer number is assigned which is also shown in other parts of the respective figure. The picture types and frame numbers shown in the buffers represent a snapshot only when the decoding is starting, and they may change in the further processing. The frame buffers (represented by FRBUF in FIG. 4) each store a decoded picture whereas the code buffers each store encoded data of a picture, whereby these code buffers can be formed by respective (e.g. dynamically changing) storage areas in bitstream buffer BSBUF.

At the bottom of FIGS. 5 to 12 three, or six, columns named 'show', 'decode' and 'parse' are depicted in backwards decoding time direction $t_B$. These columns indicate which picture number of the above GOP picture sequence and which related frame or code buffer is used for displaying a picture out of a frame buffer, decoding a picture into a frame buffer and for parsing a picture or several pictures within the stream bit buffer. The buffer numbers in columns 'show' and 'decode' refer to corresponding frame buffer numbers whereas the buffer numbers in column 'parse' refer to corresponding code buffer numbers. Picture numbers having the format xx-1 or xxx-1 refer to the adjacent previous GOP structure and not to the current GOP structure.

Decoding and displaying B-pictures can be performed nearly simultaneously as mentioned above. The 'decode' column is therefore to be thought as being shifted up by a time period that lies between some picture lines and a frame, e.g. by half a picture.

Although parsing is carried out for I- and P-pictures it is not depicted in the 'parse' column. Due to the fact that both picture types are represented by a very large amount of data already in the encoded format, they are removed from the bitstream buffer at the time when they are decoded by the decoder block. Only decoded I- and P-pictures are stored in the frame buffers as shown and B- or Bs-pictures are stored in encoded format preferably within the bitstream buffer to save memory. All normal B-frames are decoded on-the-fly or, alternatively, are temporally stored in an available frame buffer before display.

A 'pause' within the 'show' column indicates that the last shown picture before that pause is repeated to the viewer and not that any blanking appears.

All these figures show the trick mode of backwards decoding if all pictures are displayed. These principles, however, can partly be taken also for anchor frame decoding by skipping B-frame decoding, decoding all anchor frames (I, P, [Bs]) only and displaying them in the reverse order.

Figure 5:
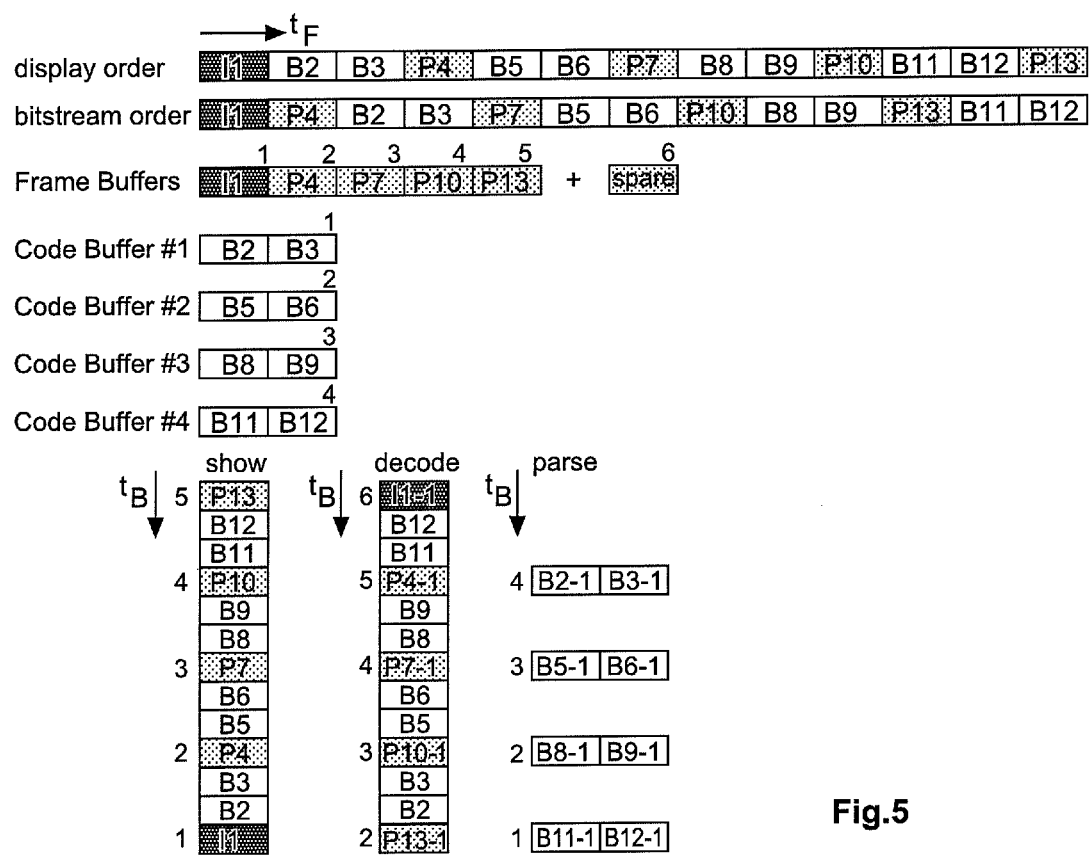
FIG. 5 display and bitstream order, and prior art backwards decoding and reverse playback, of an MPEG-2 GOP structure using a complete set of frame buffers for I and P pictures.

In the prior art backwards decoding and reverse playback processing of an MPEG-2 closed GOP structure according to FIG. 5 a complete set of frame buffers for I and P pictures is used. 'Complete' means that the decoder has, with respect to a current GOP structure, its own frame buffer for every anchor frame plus a spare frame buffer for background decoding.

The decoding for a GOP starts with decoding anchor pictures I1, P4, P7, P10 and P13 of the current GOP and storing them initially in the frame buffers 1 to 5 (FRBUF), respectively. These decoding steps are not depicted in the column 'decode', but would be arranged prior (i.e. above, in the drawing) to column 'decode' at corresponding GOP time instants where in the depicted column 'decode' the respective pictures I1-1, P4-1, P7-1, P10-1 and P13-1 are arranged. The B pictures of the GOP are initially stored and parsed for generating the bitstream index information items BSII in corresponding code buffers #1 to #4, i.e. in identifiable areas of bit buffer BSBUF.

Thereafter, the data for picture I1-1 from the previous GOP (i.e. the next GOP in backward direction) are parsed/read from bitstream buffer BSBUF generating corresponding bitstream index information items BSII and are decoded using BSII and intermediately stored in spare frame buffer 6. While decoding picture I1-1, the previously decoded picture P13 is read from frame buffer 5 and displayed. Thereafter, pictures B12 and B11 are decoded from code buffer #4 and are displayed on-the-fly using corresponding bitstream index information items BSII.

Next, picture P10 is read from frame buffer 4 and displayed while the data for picture P4-1 from the previous GOP are parsed/read from bitstream buffer BSBUF generating corresponding bitstream index information items BSII and are decoded using BSII and intermediately stored in frame buffer 5, and while the data for pictures B2-1 and B3-1 are parsed in bitstream buffer BSBUF generating corresponding bitstream index information items BSII and are assigned to, or stored in, that code buffer from which pictures B12 and B11 have just been read before, i.e. code buffer #4. Thereafter, pictures B9 and B8 are decoded from code buffer #3 and are displayed on-the-fly using corresponding bitstream index information items BSII.

Next, picture P7 is read from frame buffer 3 and displayed while the data for picture P7-1 from the previous GOP are parsed/read from bitstream buffer BSBUF generating corresponding bitstream index information items BSII and are decoded using BSII and intermediately stored in frame buffer 4, and while the data for pictures B5-1 and B6-1 are parsed in bitstream buffer BSBUF generating corresponding bitstream index information items BSII and are assigned to, or stored in, that code buffer from which pictures B9 and B8 have just been read before, i.e. code buffer #3. Thereafter, pictures B6 and B5 are decoded from code buffer #2 and are displayed on-the-fly using corresponding bitstream index information items BSII.

Next, picture P4 is read from frame buffer 2 and displayed while the data for picture P10-1 from the previous GOP are parsed/read from bitstream buffer BSBUF generating corresponding bitstream index information items BSII and are decoded using BSII and intermediately stored in frame buffer 3, and while the data for pictures B8-1 and B9-1 are parsed in bitstream buffer BSBUF generating corresponding bitstream index information items BSII and are assigned to, or stored in, that code buffer from which pictures B6 and B5 have just been read before, i.e. code buffer #2. Thereafter, pictures B3 and B2 are decoded from code buffer #1 and are displayed on-the-fly using corresponding bitstream index information items BSII.

Next, picture I1 is read from frame buffer 1 and displayed while the data for picture P13-1 from the previous GOP are parsed/read from bitstream buffer BSBUF generating corresponding bitstream index information items BSII and are decoded using BSII and intermediately stored in frame buffer 2, and while the data for pictures B11-1 and B12-1 are parsed in bitstream buffer BSBUF generating corresponding bitstream index information items BSII and are assigned to, or stored in, that code buffer from which pictures B3 and B2 have just been read before, i.e. code buffer #1.

This kind of processing is repeated for the next GOP in backward direction (i.e. the previous GOP with respect to forward direction). However, because the anchor picture numbers/frame buffer numbers have changed, the frame buffer numbers shown in columns 'show' and 'decode' are correspondingly re-ordered, i.e. running from '2' to '6' in column 'show' and running from '1' to '5' in column 'decode', and so on. Correspondingly, the code buffer numbers used are re-ordered.

Using a complete frame buffer set allows decoding backwards in normal speed. However, this type of processing is not flexible and is expensive in frame buffers.

Figure 6:
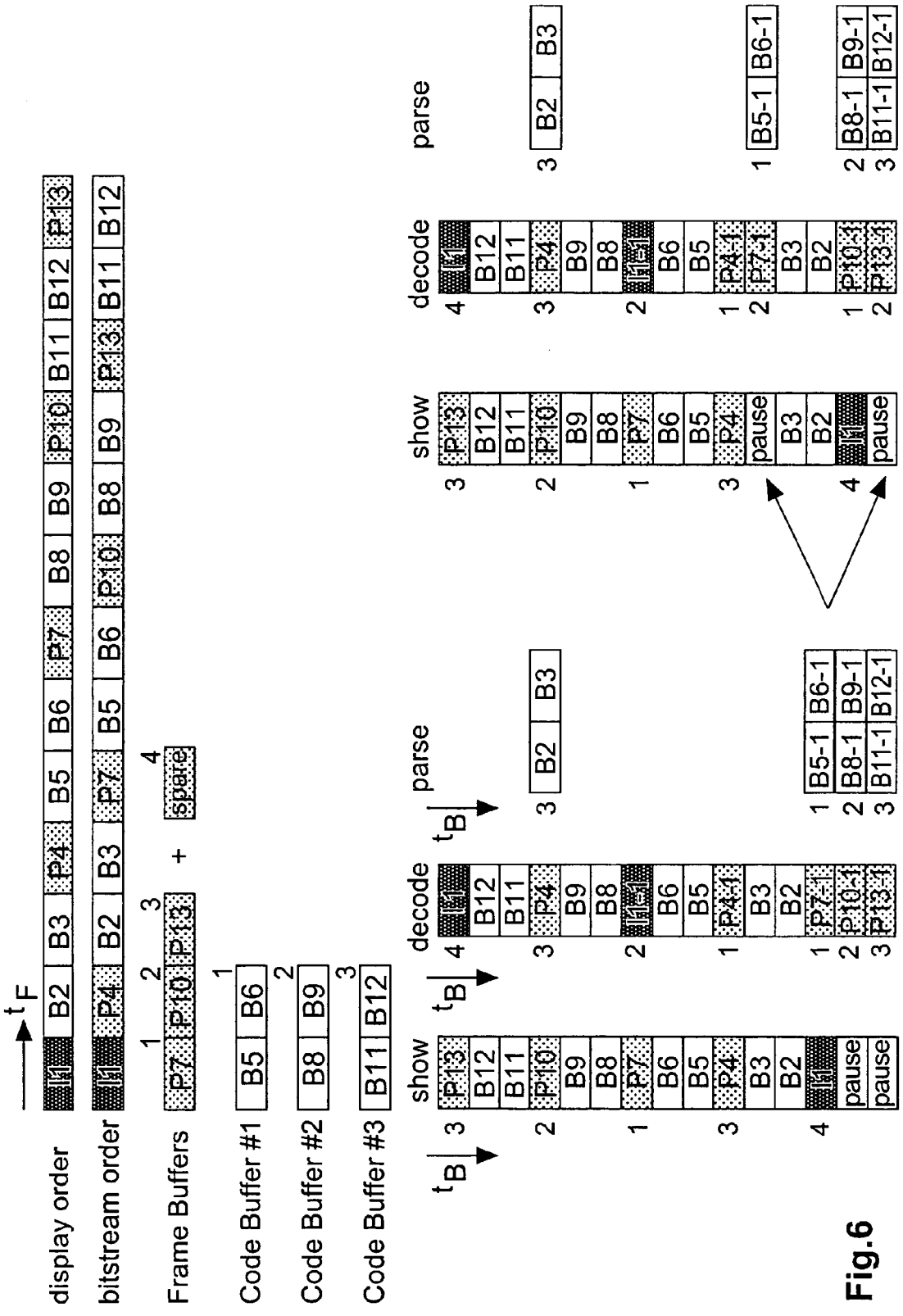
FIG. 6 the display and bitstream order of FIG. 5 but using a reduced set of frame buffers for I and P pictures for backwards decoding and reverse playback.

According to the invention the required number of frame buffers can be reduced from 6 to 4 and the required number of code buffers can be reduced from 4 to 3 with no significant subjective deterioration of the resulting backward mode display quality for an MPEG-2 closed GOP structure having e.g. 13 pictures in total. At least one display frame buffer and two extra frame buffers for background decoding are required. The schemes depicted in FIG. 6 show that backwards decoding is not possible in true normal speed, however, it is possible in only approximately 15% less than normal speed. The deviation from normal speed is caused by that the anchor frames are to be reconstructed several times during the decoding process, depending of the GOP size, before the decoding for the previous GOP can be started with. Resulting is a pause (in which repeatedly e.g. the same pause picture is displayed, preferably the last displayed anchor frame) in the display process, but not in the decoding process, and thus a jerky visualisation.

In the scheme according to the three right-hand columns in FIG. 6 the pause normally appearing at the end of the GOP display queue is split into several parts by introducing a corresponding quantity of artificial pauses in the display process, thereby reducing the overall jerkiness and providing a smother picture content motion flow and thus a more pleasant viewing. To split the pause, a total number of frame buffers (excluding the spare frame buffer) is required that is at least the integer of one half of the number of anchor frames in the GOP.

In the scheme according to the three left-hand columns in FIG. 6, the decoding for a GOP starts with decoding anchor pictures I1, P4, P7, P10 and P13 of the current GOP and initially storing anchor pictures P7, P10 and P13 in the frame buffers 1 to 3 (FRBUF), respectively. These decoding steps are not depicted in the column 'decode', but would be arranged prior (i.e. above, in the drawing) to column 'decode' at corresponding GOP time instants. The B pictures B5 to B12 of the GOP are initially stored and parsed for generating the bitstream index information items BSII in corresponding code buffers #1 to #3, i.e. in identifiable areas of bit buffer BSBUF.

Thereafter, the data for picture I1 are parsed/read from bitstream buffer BSBUF generating (or using, because for I1, P4, B2 and B3 belonging to the same GOP BSII can be used from a previous GOP parsing) corresponding bitstream index information items BSII and are decoded using BSII and intermediately stored in spare frame buffer 4. While decoding picture I1, the previously decoded picture P13 is read from frame buffer 3 and is displayed. Thereafter, pictures B12 and B11 are decoded from code buffer #3 and are displayed on-the-fly using corresponding bitstream index information items BSII.

Next, picture P10 is read from frame buffer 2 and displayed while the data for picture P4 are parsed/read from bitstream buffer BSBUF generating or using corresponding bitstream index information items BSII and are decoded using BSII and intermediately stored in frame buffer 3, and while the data for pictures B2 and B3 are parsed in bitstream buffer BSBUF generating or using corresponding bitstream index information items BSII and are assigned to, or stored in, that code buffer from which pictures B12 and B11 have just been read before, i.e. code buffer #3. Thereafter, pictures B9 and B8 are decoded from code buffer #2 and are displayed on-the-fly using corresponding bitstream index information items BSII. Next, picture P7 is read from frame buffer 1 and displayed while the data for picture I1-1 from the previous GOP (i.e. the next GOP in backward direction) are parsed/read from bitstream buffer BSBUF generating corresponding bitstream index information items BSII and are decoded using BSII and intermediately stored in frame buffer 2. Thereafter, pictures B6 and B5 are decoded from code buffer #1 and are displayed on-the-fly using corresponding bitstream index information items BSII.

Next, picture P4 is read from frame buffer 3 and displayed while the data for picture P4-1 from the previous GOP are parsed/read from bitstream buffer BSBUF generating corresponding bitstream index information items BSII and are decoded using BSII and intermediately stored in frame buffer 1. Thereafter, pictures B3 and B2 are decoded from code buffer #3 and are displayed on-the-fly using corresponding bitstream index information items BSII.

Next, picture I1 is read from frame buffer 4 and displayed while the data for picture P7-1 from the previous GOP are parsed/read from bitstream buffer BSBUF generating corresponding bitstream index information items BSII and are decoded using BSII and intermediately stored in frame buffer 1, and while the data for pictures B5-1 and B6-1 are parsed in bitstream buffer BSBUF generating corresponding bitstream index information items BSII and are assigned to, or stored in, that code buffer from which pictures B5 and B6 have been read before, i.e. code buffer #1.

Next, the data for picture P10-1 from the previous GOP are parsed/read from bitstream buffer BSBUF generating corresponding bitstream index information items BSII and are decoded using BSII and intermediately stored in frame buffer 2, while picture I1 is again read from frame buffer 4 and displayed, and while the data for pictures B8-1 and B9-1 are parsed in bitstream buffer BSBUF generating corresponding bitstream index information items BSII and are assigned to, or stored in, that code buffer from which pictures B8 and B9 have been read before, i.e. code buffer #2.

Next, the data for picture P13-1 from the previous GOP are parsed/read from bitstream buffer BSBUF generating corresponding bitstream index information items BSII and are decoded using BSII and intermediately stored in frame buffer 3, while picture I1 is again read from frame buffer 4 and displayed, and while the data for pictures B11-1 and B12-1 are parsed in bitstream buffer BSBUF generating corresponding bitstream index information items BSII and are assigned to, or stored in, code buffer #3.

This kind of processing is repeated for the next GOP in backward direction (i.e. the previous GOP with respect to forward direction). However, because the anchor picture numbers/frame buffer numbers have changed, the frame buffer numbers shown in columns 'show' and 'decode' are correspondingly re-ordered.

The processing scheme depicted in the three right-hand columns of FIG. 6 starts like that in the three left-hand columns of FIG. 6 until decoding of picture P4-1 and displaying picture P4.

Next, picture P4 is again read from frame buffer 3 and displayed while the data for picture P7-1 from the previous GOP are parsed/read from bitstream buffer BSBUF generating corresponding bitstream index information items BSII and are decoded using BSII and intermediately stored in frame buffer 2, and while the data for pictures B5-1 and B6-1 are parsed in bitstream buffer BSBUF generating corresponding bitstream index information items BSII and are assigned to, or stored in, that code buffer from which pictures B5 and B6 have been read before, i.e. code buffer #1. Thereafter, pictures B3 and B2 are decoded from code buffer #3 and are displayed on-the-fly using corresponding bitstream index information items BSII.

Next, picture I1 is read from frame buffer 4 and displayed, while the data for picture P10-1 from the previous GOP are parsed/read from bitstream buffer BSBUF generating corresponding bitstream index information items BSII and are decoded using BSII and intermediately stored in frame buffer 1, and while the data for pictures B8-1 and B9-1 are parsed in bitstream buffer BSBUF generating corresponding bitstream index information items BSII and are assigned to, or stored in, that code buffer from which pictures B8 and B9 have been read before, i.e. code buffer #2.

Next, picture I1 is again read from frame buffer 4 and displayed, while the data for picture P13-1 from the previous GOP are parsed/read from bitstream buffer BSBUF generating corresponding bitstream index information items BSII and are decoded using BSII and intermediately stored in frame buffer 3, and while the data for pictures B11-1 and B12-1 are parsed in bitstream buffer BSBUF generating corresponding bitstream index information items BSII and are assigned to, or stored in, code buffer #3.

This kind of processing is repeated for the next GOP in backward direction (i.e. the previous GOP with respect to forward direction). However, because the anchor picture numbers/frame buffer numbers have changed, the frame buffer numbers shown in columns 'show' and 'decode' are correspondingly re-ordered.

Generally speaking, until arrival at the beginning of the current GOP, the presentation or display of the remaining pictures of the current GOP is continued using remaining ones of decoded anchor pictures I, P intermediately stored in the dedicated picture buffers and using the corresponding interspersed non-anchor pictures B, thereby repeating at least once the presentation or display of at least N of the decoded anchor pictures of the current GOP, in order to make available decoding processing time for repeatedly decoding anchor pictures of the current GOP which do not belong to the group of last decoded anchor pictures of the current GOP, and in order to avoid repeating N times presentation or display of one of the decoded anchor pictures, wherein N is an integer greater than 1, wherein the presentation or display of a current GOP is carried out such that when finalising it the corresponding decoded anchor pictures for the following GOP to be presented or displayed are again stored in the dedicated picture buffers FRBUF.

Figure 7:
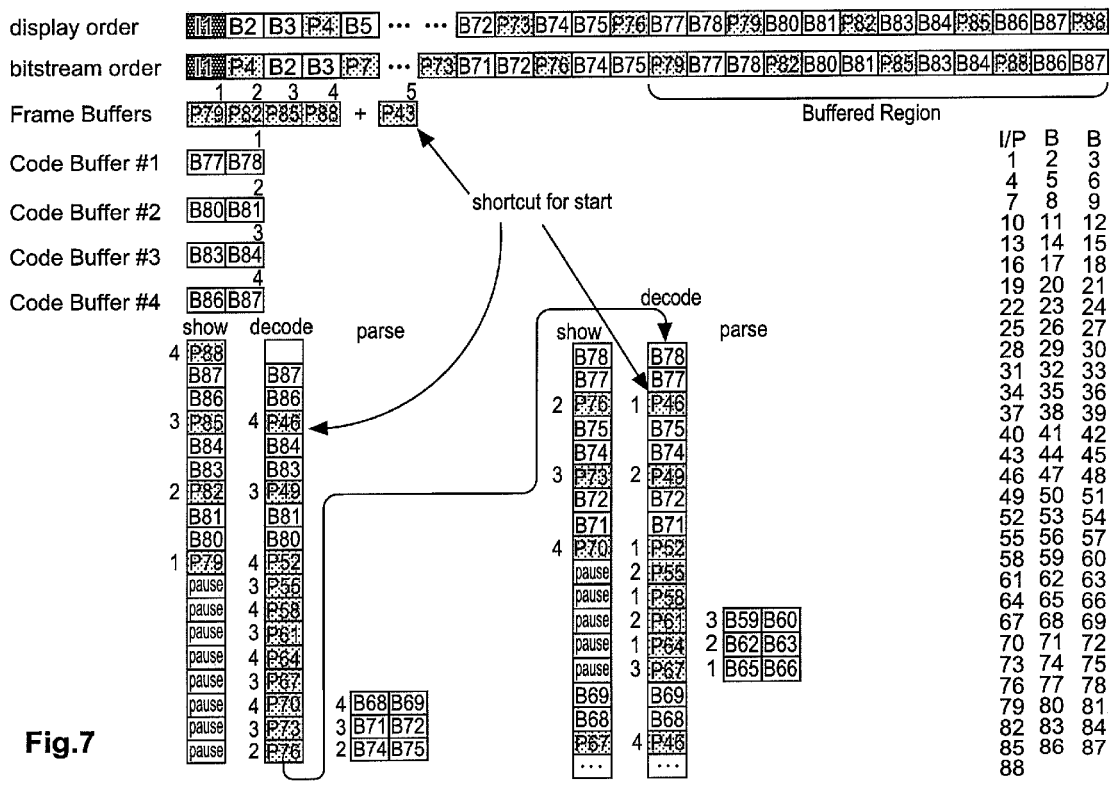
FIG. 7 backwards decoding and reverse playback of long GOP structures.

In FIG. 7 a long MPEG-2 GOP having 88 frames is depicted. 'Long GOP' means a GOP that has a display period of more than about 0.5 seconds, i.e. a GOP that includes more than 12 or 13 frames in 50 Hz systems and more than 15 frames in 60 Hz systems. According to the prior art backwards decoding processing scheme in FIG. 5 the number of frame buffers needed would increase significantly. However, such high number of picture buffers cannot be provided for trick mode replay due to cost reasons.

According to the invention a decoded anchor frame (P43 in this example) located at about the middle of the GOP is pre-stored in an extra or short cut frame buffer 5. By choosing a nifty or convenient anchor frame for storage in the shortcut frame buffer the necessary but unpleasant pause or pauses during reverse playback of a GOP can be shortened while again decoding the required anchor frames (P46 to P76) for a buffered region (B65 to P76) adjacent to the initially buffered region can be shortened. This extra frame buffer facilitates a short cut because it allows to re-start decoding of the anchor frames of the GOP from that position instead of from the very beginning of the GOP. It is advantageous to fill the short cut frame buffer with a decoded picture of the GOP which is located at a position in GOP display time that is one half or about one half of the time period between the GOP start and the other buffered decoded anchor frames. The short cut frame buffer is initially filled during the initial or first anchor frame decoding through the GOP. When during the backward display process the short cut picture (P43) itself has been evaluated, another short cut frame buffer out of the available frame buffers can be generated again, selecting such an anchor frame for short cut that is located at or at about one half of the display time from the GOP start to the buffered anchor frames available, excluding the pictures of the GOP having already been displayed.

The anchor frames from an initially buffered region (B77 to P88) are pre-stored or initially stored in the frame buffers 1 to 4 (FRBUF), respectively.

The decoding for a GOP starts with decoding the anchor pictures (P79, P82, P85 and P88 in this example) of a current GOP and initially storing these anchor pictures P79, P82, P85 and P88 of an initially buffered region (B77 to P88) located at the end of the current GOP in the frame buffers 1 to 4 (FRBUF), respectively. These decoding steps are not depicted in the column 'decode', but would be arranged prior (i.e. above, in the drawing) to column 'decode'. This first or initial decoding through the GOP preferably includes the generation of corresponding bitstream index information items BSII for the whole GOP stored in buffer BSINDB.

As mentioned above, a decoded anchor frame (P43 in this example) located at or at about the middle of the GOP is thereby initially stored in an extra or short cut frame buffer 5. By making available such anchor frame the unavoidable and unpleasant pause or pauses while again decoding the required anchor frames (P46 to P76) for a buffered region (B65 to P76 in this example) adjacent to the initially buffered region can be shortened. It is advantageous to fill the short cut frame buffer with a decoded picture of the GOP which is located at a position in GOP display time that is one half or about one half of the time from the GOP start to the other buffered anchor frames. The short cut frame buffer is initially filled during the first anchor frame decoding through the GOP. When during the backward display process the short cut picture (P43) itself has been evaluated, another short cut frame buffer out of the available frame buffers can be generated again, selecting such an anchor frame for short cut that is located at or at about one half of the display time from the GOP start to the buffered anchor frames available, excluding the pictures of the GOP having already been displayed.

Thereafter, decoded picture P88 is read from frame buffer 4 and is displayed. Pictures B87 and B86 are decoded from code buffer #4 using pictures P88 and P85, and are displayed on-the-fly using corresponding bitstream index information items BSII. The data for picture P46 are parsed/read from bitstream buffer BSBUF using (or generating) corresponding bitstream index information items BSII and are decoded (using BSII, respectively) and intermediately stored in frame buffer 4 while decoded picture P85 is read from frame buffer 3 and displayed. Next, pictures B84 and B83 are decoded from code buffer #3 using pictures P85 and P82 and are displayed on-the-fly using corresponding bitstream index information items BSII.

Thereafter, the data for picture P49 are parsed/read from bitstream buffer BSBUF using corresponding bitstream index information items BSII and are decoded and intermediately stored in frame buffer 3 while decoded picture P82 is read from frame buffer 2 and displayed. Next, pictures B81 and B80 are decoded from code buffer #2 using pictures P82 and P79 and are displayed on-the-fly using corresponding bitstream index information items BSII.

Thereafter, the data for picture P52 are parsed/read from bitstream buffer BSBUF using corresponding bitstream index information items BSII and are decoded and intermediately stored in frame buffer 4 while decoded picture P79 is read from frame buffer 1 and displayed.

After the lowest-index anchor frame P79 of the current buffered region has been displayed for the first time, it can be repeatedly displayed as a pause picture while the necessary anchor pictures for accessing the next GOP are decoded.

The data for picture P55 are parsed/read from bitstream buffer BSBUF using corresponding bitstream index information items BSII and are decoded and intermediately stored in frame buffer 3 while picture P79 is again read from frame buffer 1 and displayed. The data for picture P58 are parsed/read from bitstream buffer BSBUF using corresponding bitstream index information items BSII and are decoded and intermediately stored in frame buffer 4 while picture P79 is again read from frame buffer 1 and displayed. The data for picture P61 are parsed/read from bitstream buffer BSBUF using corresponding bitstream index information items BSII and are decoded and intermediately stored in frame buffer 3 while picture P79 is again read from frame buffer 1 and displayed. The data for picture P64 are parsed/read from bitstream buffer BSBUF using corresponding bitstream index information items BSII and are decoded and intermediately stored in frame buffer 4 while picture P79 is again read from frame buffer 1 and displayed. The data for picture P67 are parsed/read from bitstream buffer BSBUF using corresponding bitstream index information items BSII and are decoded and intermediately stored in frame buffer 3 while picture P79 is again read from frame buffer 1 and displayed. The data for picture P70 are parsed/read from bitstream buffer BSBUF using corresponding bitstream index information items BSII and are decoded and intermediately stored in frame buffer 4 while picture P79 is again read from frame buffer 1 and displayed, and while the data for pictures B68 and B69 are parsed in bitstream buffer BSBUF using corresponding bitstream index information items BSII and are assigned to, or stored in, that code buffer from which encoded pictures B86/B87 have been read before, i.e. code buffer #4. The data for picture P73 are parsed/read from bitstream buffer BSBUF using corresponding bitstream index information items BSII and are decoded and intermediately stored in frame buffer 3 while picture P79 is again read from frame buffer 1 and displayed, and while the data for pictures B71 and B72 are parsed in bitstream buffer BSBUF using corresponding bitstream index information items BSII and are assigned to, or stored in, that code buffer from which encoded pictures B83/B84 have been read before, i.e. code buffer #3. The data for picture P76 are parsed/read from bitstream buffer BSBUF using corresponding bitstream index information items BSII and are decoded and intermediately stored in frame buffer 2 while picture P79 is again read from frame buffer 1 and displayed, and while the data for pictures B74 and B75 are parsed in bitstream buffer BSBUF using corresponding bitstream index information items BSII and are assigned to, or stored in, that code buffer from which encoded pictures B80/B81 have been read before, i.e. code buffer #2.

Next, pictures B78 and B77 are decoded from code buffer #1 using pictures P79 and P76, and are displayed on-the-fly. Thereafter, the data for picture P46 are parsed/read from bitstream buffer BSBUF using corresponding bitstream index information items BSII and are decoded and intermediately stored in frame buffer 1 while decoded picture P76 is read from frame buffer 2 and displayed. Next, pictures B75 and B74 are decoded from code buffer #2 using pictures P76 and P73 and are displayed on-the-fly using corresponding bitstream index information items BSII.

Thereafter, the data for picture P49 are parsed/read from bitstream buffer BSBUF using corresponding bitstream index information items BSII and are decoded and intermediately stored in frame buffer 2 while decoded picture P73 is read from frame buffer 3 and displayed. Next, pictures B72 and B71 are decoded from code buffer #3 using pictures P73 and P70 and are displayed on-the-fly using corresponding bitstream index information items BSII.

Thereafter, the data for picture P52 are parsed/read from bitstream buffer BSBUF using corresponding bitstream index information items BSII and are decoded and intermediately stored in frame buffer 1 while decoded picture P70 is read from frame buffer 4 and displayed.

After the lowest-index anchor frame P70 of the current buffered region has been displayed for the first time, it can be repeatedly displayed as a pause picture while the necessary anchor pictures for accessing the next GOP are decoded.

The data for picture P55 are parsed/read from bitstream buffer BSBUF using corresponding bitstream index information items BSII and are decoded and intermediately stored in frame buffer 2 while picture P70 is again read from frame buffer 4 and displayed. The data for picture P58 are parsed/read from bitstream buffer BSBUF using corresponding bitstream index information items BSII and are decoded and intermediately stored in frame buffer 1 while picture P70 is again read from frame buffer 4 and displayed. The data for picture P61 are parsed/read from bitstream buffer BSBUF using corresponding bitstream index information items BSII and are decoded and intermediately stored in frame buffer 2 while picture P70 is again read from frame buffer 4 and displayed, and while the data for pictures B59 and B60 are parsed in bitstream buffer BSBUF using corresponding bitstream index information items BSII and are assigned to, or stored in, that code buffer from which encoded pictures B71/B72 have been read before, i.e. code buffer #3. The data for picture P64 are parsed/read from bitstream buffer BSBUF using corresponding bitstream index information items BSII and are decoded and intermediately stored in frame buffer 1 while picture P70 is again read from frame buffer 4 and displayed, and while the data for pictures B62 and B63 are parsed in bitstream buffer BSBUF using corresponding bitstream index information items BSII and are assigned to, or stored in, that code buffer from which encoded pictures B74/B75 have been read before, i.e. code buffer #2.

The data for picture P67 are parsed/read from bitstream buffer BSBUF using corresponding bitstream index information items BSII and are decoded and intermediately stored in frame buffer 3 while picture P70 is again read from frame buffer 4 and displayed, and while the data for pictures B65 and B66 are parsed in bitstream buffer BSBUF using corresponding bitstream index information items BSII and are assigned to, or stored in, that code buffer from which encoded pictures B77/B78 have been read before, i.e. code buffer #1. Next, pictures B69 and B68 are decoded from code buffer #4 using pictures P70 and P67, and are displayed on-the-fly. Thereafter, the data for picture P46 are parsed/read from bitstream buffer BSBUF using corresponding bitstream index information items BSII and are decoded and intermediately stored in e.g. frame buffer 4 while decoded picture P67 is read from frame buffer 3 and displayed.

This kind of processing is repeated correspondingly for the following buffered regions in backward direction. However, because the anchor picture numbers, frame buffer numbers and code buffer numbers have changed, the frame buffer numbers shown in columns 'show' and 'decode' and the code buffer numbers shown in column 'parse' are correspondingly re-ordered.

Figure 8:
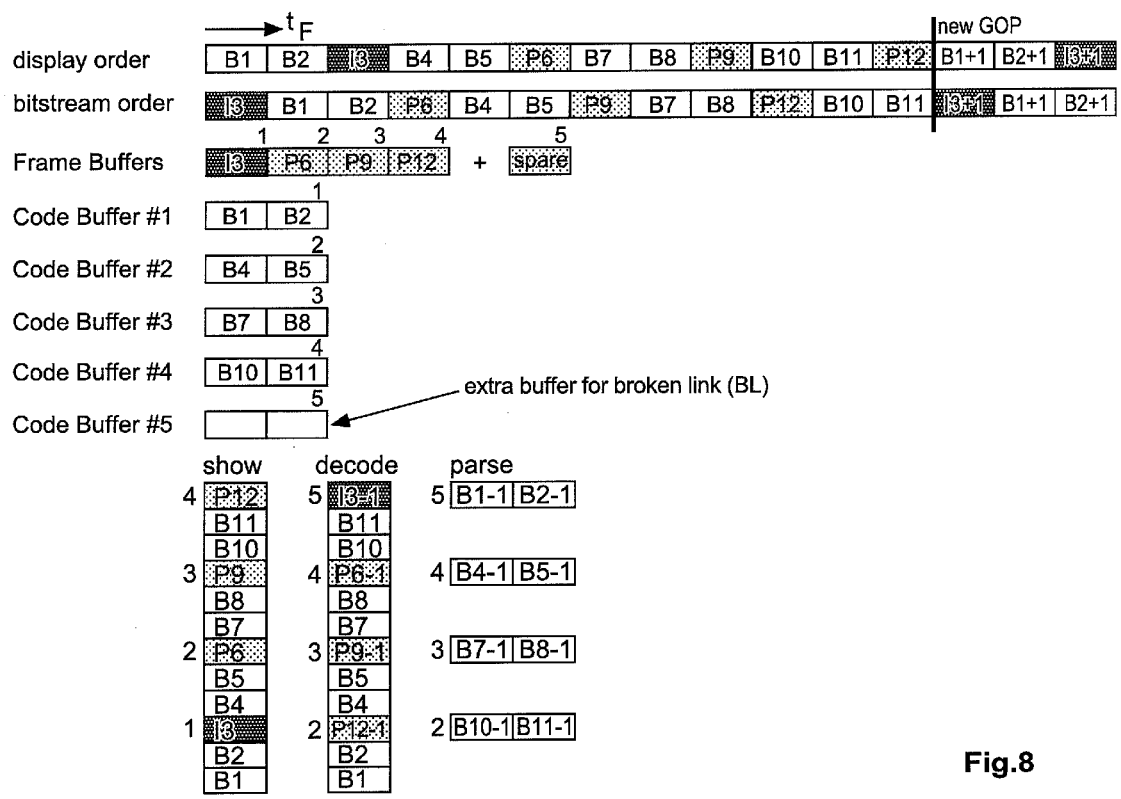
FIG. 8 display and bitstream order of an MPEG-2 broken link GOP structure, and backwards decoding and reverse playback of such GOP structure, but using the same number of frame buffers only as in FIG. 5.

For backwards decoding and reverse playback processing of the MPEG-2 GOP Broken Link structure in FIG. 8 a complete set of frame buffers for I and P pictures can be used. Broken Link GOP means that a GOP does not start with an I picture but with a B picture the prediction for which requires access to an anchor picture from the adjacent GOP, i.e. the GOP is an open GOP. Following the last anchor picture in a current GOP the following GOP (in forward direction) starts with the first B picture of that following GOP. Again, 'complete' means that the decoder has, with respect to a current GOP structure, its own frame buffer for every anchor frame plus a spare frame buffer for background decoding, allowing normal speed reverse playback. According to the invention, for backwards decoding of such broken-link GOP no further extra frame buffer is required. However, an additional bitstream buffer is required in comparison to the FIG. 5 processing. Otherwise the background parsing of the B-pictures would overwrite information still needed for the decoding process. Code Buffer #1 is required for decoding pictures B2 and B1 and a separate bitstream buffer is needed to take in pictures B1-1 and B2-1.

The decoding for a GOP starts with decoding anchor pictures I3, P6, P9 and P12 of the current GOP and storing them initially in the frame buffers 1 to 4 (FRBUF), respectively. These decoding steps are not depicted in the column 'decode', but would be arranged prior (i.e. above, in the drawing) to column 'decode'. The B pictures of the GOP are initially stored in corresponding code buffers #1 to #4, i.e. in identifiable areas of bit buffer BSBUF.

Thereafter, the data for picture I3-1 from the previous GOP (i.e. the next GOP in backward direction) are parsed/read from bitstream buffer BSBUF generating corresponding bitstream index information items BSII and are decoded using BSII and intermediately stored in spare frame buffer 5. While decoding picture I3-1, the data for pictures B1-1 and B2-1 are parsed in bitstream buffer BSBUF generating corresponding bitstream index information items BSII and are assigned to, or stored in, code buffer #5, and the previously decoded picture P12 is read from frame buffer 4 and displayed. Thereafter, pictures B11 and B10 are decoded from code buffer #4 and are displayed on-the-fly using corresponding bitstream index information items BSII.

Next, picture P9 is read from frame buffer 3 and displayed while the data for picture P6-1 from the previous GOP are parsed/read from bitstream buffer BSBUF generating corresponding bitstream index information items BSII and are decoded using BSII and intermediately stored in frame buffer 4, and while the data for pictures B4-1 and B5-1 are parsed in bitstream buffer BSBUF generating corresponding bitstream index information items BSII and are assigned to, or stored in, that code buffer from which pictures B11 and B10 have just been read before, i.e. code buffer #4. Thereafter, pictures B8 and B7 are decoded from code buffer #3 and are displayed on-the-fly using corresponding bitstream index information items BSII.

Next, picture P6 is read from frame buffer 2 and displayed while the data for picture P9-1 from the previous GOP are parsed/read from bitstream buffer BSBUF generating corresponding bitstream index information items BSII and are decoded using BSII and intermediately stored in frame buffer 3, and while the data for pictures B7-1 and B8-1 are parsed in bitstream buffer BSBUF generating corresponding bitstream index information items BSII and are assigned to, or stored in, that code buffer from which pictures B8 and B7 have just been read before, i.e. code buffer #3. Thereafter, pictures B5 and B4 are decoded from code buffer #2 and are displayed on-the-fly using corresponding bitstream index information items BSII.

Next, picture I3 is read from frame buffer 1 and displayed while the data for picture P12-1 from the previous GOP are parsed/read from bitstream buffer BSBUF generating corresponding bitstream index information items BSII and are decoded using BSII and intermediately stored in frame buffer 2, and while the data for pictures B10-1 and B11-1 are parsed in bitstream buffer BSBUF generating corresponding bitstream index information items BSII and are assigned to, or stored in, that code buffer from which pictures B5 and B4 have just been read before, i.e. code buffer #2. Thereafter, pictures B2 and B1 are decoded from code buffer #1 and are displayed on-the-fly using corresponding bitstream index information items BSII.

This kind of processing is repeated for the next GOP in backward direction (i.e. the previous GOP with respect to forward direction). However, because the anchor picture numbers, frame buffer numbers and code buffer numbers have changed, the frame buffer numbers shown in columns 'show' and 'decode' and the code buffer numbers shown in column 'parse' are correspondingly re-ordered, i.e. running from '2' to '5' in column 'show' and running from '1' to '4' in column 'decode', and so on. Correspondingly, the code buffer numbers used are re-ordered.

Generally speaking, until arrival at the beginning of the current GOP, the presentation or display of the remaining pictures of the current GOP is continued using remaining ones of decoded anchor pictures intermediately stored in the dedicated picture buffers and using the corresponding interspersed non-anchor pictures, thereby repeating at least once the presentation or display of at least two of the decoded anchor pictures of the current GOP, in order to make available decoding processing time for repeatedly decoding those anchor pictures of the current GOP which do not belong to the group of last decoded anchor pictures of the current group of picture, wherein the presentation or display of a current GOP is carried out such that when finalising it the corresponding decoded anchor pictures for the following GOP to be presented or displayed are again stored in the dedicated picture buffers FRBUF.

Figure 9:
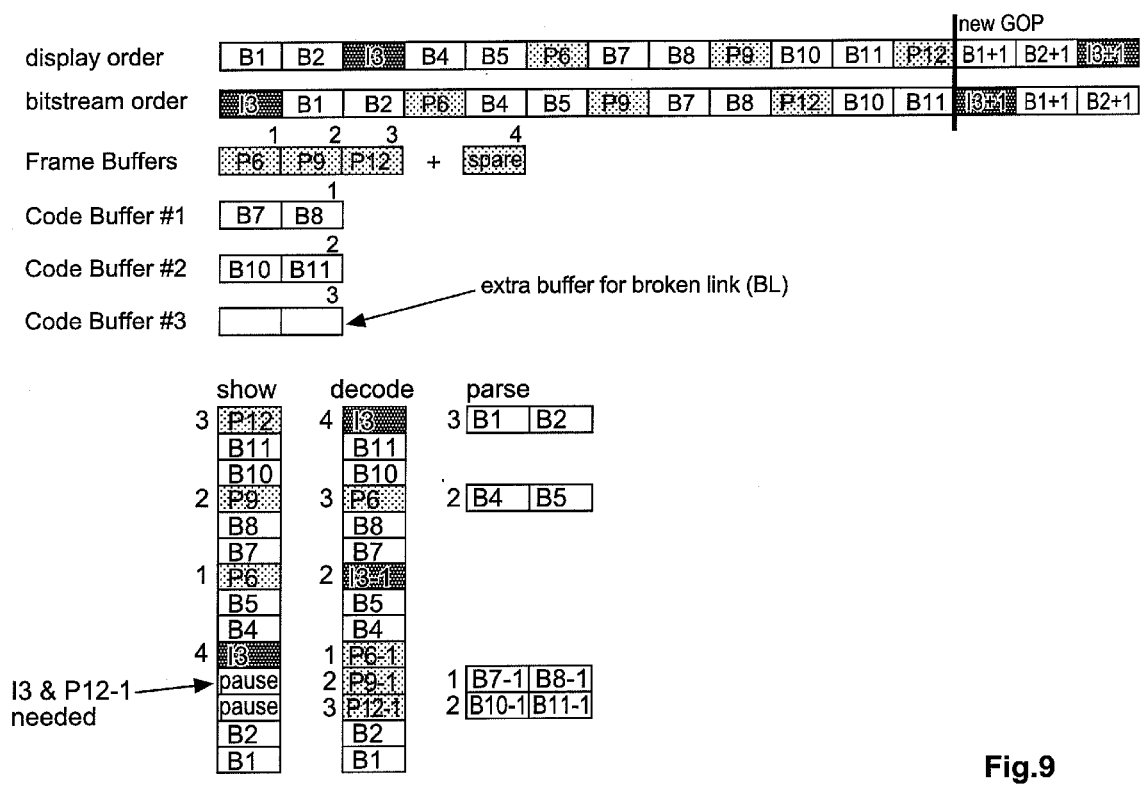
FIG. 9 the display and bitstream order of FIG. 8 but using a reduced set of frame buffers for I and P pictures for backwards decoding and reverse playback.

For backwards decoding and reverse playback processing of the MPEG-2 GOP Broken Link structure in FIG. 9 a reduced number of frame buffers for I and P pictures and a reduced number of code buffers for B pictures can be used, with respect to the buffer numbers required in the FIG. 8 embodiment, allowing near normal speed reverse playback. The FIG. 9 embodiment adapts the embodiment of FIG. 6 to a broken link GOP structure. Like in FIG. 6 the unavoidable pause per GOP can also be split into two parts (not depicted).

The decoding for a GOP starts with decoding anchor pictures I3, P6, P9 and P12 of the current GOP and storing P6, P9 and P12 initially in the frame buffers 1 to 3 (FRBUF), respectively. These decoding steps are not depicted in the column 'decode', but would be arranged prior (i.e. above, in the drawing) to column 'decode'. The B pictures B7 to B11 of the GOP are initially stored and parsed for generating the bitstream index information items BSII in corresponding code buffers #1 and #2, i.e. in identifiable areas of bit buffer BSBUF.

Thereafter, the data for picture I3 are parsed/read from bitstream buffer BSBUF generating (or using, because for B1, B2, I3, B4, B5 and P6 belonging to the same GOP BSII can be used from the previous GOP parsing) corresponding bitstream index information items BSII and are decoded using BSII and intermediately stored in spare frame buffer 4. While decoding picture I3, the previously decoded picture P12 is read from frame buffer 3 and is displayed, and the data for pictures B1 and B2 are parsed in bitstream buffer BSBUF using or generating corresponding bitstream index information items BSII and are assigned to, or stored in, code buffer #3. Thereafter, pictures B11 and B10 are decoded from code buffer #2 and are displayed on-the-fly using corresponding bitstream index information items BSII.

Next, picture P9 is read from frame buffer 2 and displayed while the data for picture P6 are parsed/read from bitstream buffer BSBUF using or generating corresponding bitstream index information items BSII and are decoded using BSII and intermediately stored in frame buffer 3, and while the data for pictures B4 and B5 are parsed in bitstream buffer BSBUF using or generating corresponding bitstream index information items BSII and are assigned to, or stored in, that code buffer from which pictures B11 and B10 have just been read before, i.e. code buffer #2. Thereafter, pictures B8 and B7 are decoded from code buffer #1 and are displayed on-the-fly using corresponding bitstream index information items BSII. Next, picture P6 is read from frame buffer 1 and displayed while the data for picture I3-1 from the previous GOP (i.e. the next GOP in backward direction) are parsed/read from bitstream buffer BSBUF generating corresponding bitstream index information items BSII and are decoded using BSII and intermediately stored in frame buffer 2. Thereafter, pictures B5 and B4 are decoded from code buffer #2 and are displayed on-the-fly using corresponding bitstream index information items BSII.

Next, picture I3 is read from frame buffer 4 and displayed while the data for picture P6-1 from the previous GOP are parsed/read from bitstream buffer BSBUF generating corresponding bitstream index information items BSII and are decoded using BSII and intermediately stored in frame buffer 1.

Thereafter the data for picture P9-1 from the previous GOP are parsed/read from bitstream buffer BSBUF generating corresponding bitstream index information items BSII and are decoded using BSII and intermediately stored in frame buffer 2, while picture I3 is again read from frame buffer 4 and displayed, and while the data for pictures B7-1 and B8-1 are parsed in bitstream buffer BSBUF generating corresponding bitstream index information items BSII and are assigned to, or stored in, that code buffer from which pictures B8 and B7 have been read before, i.e. code buffer #1.

Next, the data for picture P12-1 from the previous GOP are parsed/read from bitstream buffer BSBUF generating corresponding bitstream index information items BSII and are decoded using BSII and intermediately stored in frame buffer 3, while picture I3 is again read from frame buffer 4 and displayed, and while the data for pictures B10-1 and B11-1 are parsed in bitstream buffer BSBUF generating corresponding bitstream index information items BSII and are assigned to, or stored in, code buffer #2. Thereafter, pictures B2 and B1 are decoded from code buffer #3 and are displayed on-the-fly using corresponding bitstream index information items BSII.

This kind of processing is repeated for the next GOP in backward direction (i.e. the previous GOP with respect to forward direction). However, because the anchor picture numbers/frame buffer numbers have changed, the frame buffer numbers shown in columns 'show' and 'decode' are correspondingly re-ordered.

Figure 10:
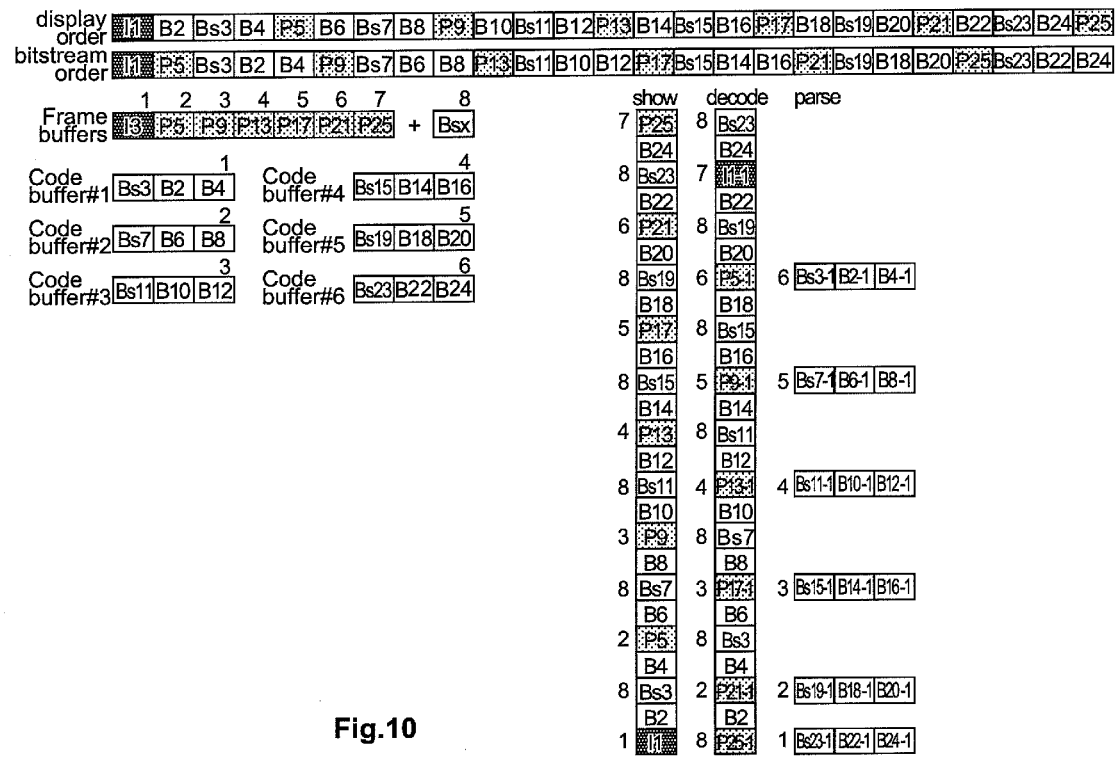
FIG. 10 display and bitstream order of an MPEG-4 B-stored GOP structure, and backwards decoding and reverse playback of such GOP, but using a single spare frame buffer only.

The MPEG-4-AVC GOP structure depicted in FIG. 10 also includes B-stored pictures Bs as anchor frames. When using a B-picture as an anchor frame it must be stored into, and kept in, a frame buffer and cannot be decoded directly (i.e. on the fly) for display. Advantageously, although a frame buffer for the Bs pictures is required, a 'complete' (i.e. storing all I and P pictures of a GOP) frame buffer set plus a spare buffer facilitates normal speed reverse playback. No further frame buffer in addition to that spare frame buffer is required.

The decoding for a GOP starts with decoding anchor pictures I1, P5, P9, P13, P17, P21 and P25 of the current GOP and storing them initially in the frame buffers 1 to 7 (FRBUF), respectively. These decoding steps are not depicted in the column 'decode', but would be arranged prior (i.e. above, in the drawing) to column 'decode'. The spare or extra buffer 8 is used for intermediately storing BS pictures only for this GOP. The Bs and the B pictures of the GOP are initially stored and parsed for generating the bitstream index information items BSII in corresponding code buffers #1 to #6, i.e. in identifiable areas of bit buffer BSBUF.

Thereafter, picture Bs23 is taken from code buffer #6 and is decoded and stored in spare frame buffer 8 while decoded picture P25 is read from frame buffer 7 and displayed. Next, picture B24 is decoded from code buffer #6 using pictures P25 and Bs23 and is displayed on-the-fly using corresponding bitstream index information items BSII.

Thereafter, the data for picture I1-1 from the previous GOP (i.e. the next GOP in backward direction) are parsed/read from bitstream buffer BSBUF generating corresponding bitstream index information items BSII and are decoded using BSII and intermediately stored in spare frame buffer 7 while decoded picture Bs23 is read from frame buffer 8 and displayed. Next, picture B22 is decoded from code buffer #6 using pictures Bs23 and P21 and is displayed on-the-fly using corresponding bitstream index information items BSII.

Thereafter, picture Bs19 is taken from code buffer #5 and is decoded and stored in spare frame buffer 8 while decoded picture P21 is read from frame buffer 6 and displayed. Next, picture B20 is decoded from code buffer #5 using pictures P21 and Bs19 and is displayed on-the-fly using corresponding bitstream index information items BSII.

Thereafter, the data for picture P5-1 from the previous GOP are parsed/read from bitstream buffer BSBUF generating corresponding bitstream index information items BSII and are decoded using BSII and intermediately stored in spare frame buffer 6 while decoded picture Bs19 is read from frame buffer 8 and displayed, and while the data for pictures Bs3-1, B2-1 and B4-1 are parsed in bitstream buffer BSBUF generating corresponding bitstream index information items BSII and are assigned to, or stored in, that code buffer from which pictures Bs23, B22 and B24 have just been read before, i.e. code buffer #6. Next, picture B18 is decoded from code buffer #5 using pictures Bs19 and P17 and is displayed on-the-fly using corresponding bitstream index information items BSII.

Thereafter, picture Bs15 is taken from code buffer #4 and is decoded and stored in spare frame buffer 8 while decoded picture P17 is read from frame buffer 5 and displayed. Next, picture B16 is decoded from code buffer #4 using pictures P17 and Bs15 and is displayed on-the-fly using corresponding bitstream index information items BSII.

Thereafter, the data for picture P9-1 from the previous GOP are parsed/read from bitstream buffer BSBUF generating corresponding bitstream index information items BSII and are decoded using BSII and intermediately stored in spare frame buffer 5 while decoded picture Bs15 is read from frame buffer 8 and displayed, and while the data for pictures Bs7-1, B6-1 and B8-1 are parsed in bitstream buffer BSBUF generating corresponding bitstream index information items BSII and are assigned to, or stored in, that code buffer from which pictures Bs19, B18 and B20 have just been read before, i.e. code buffer #5. Next, picture B14 is decoded from code buffer #4 using pictures Bs15 and P13 and is displayed on-the-fly using corresponding bitstream index information items BSII.

Thereafter, picture Bs11 is taken from code buffer #3 and is decoded and stored in spare frame buffer 8 while decoded picture P13 is read from frame buffer 4 and displayed. Next, picture B12 is decoded from code buffer #3 using pictures P13 and Bs11 and is displayed on-the-fly using corresponding bitstream index information items BSII.

Thereafter, the data for picture P13-1 from the previous GOP are parsed/read from bitstream buffer BSBUF generating corresponding bitstream index information items BSII and are decoded using BSII and intermediately stored in spare frame buffer 4 while decoded picture Bs11 is read from frame buffer 8 and displayed, and while the data for pictures Bs11-1, B10-1 and B12-1 are parsed in bitstream buffer BSBUF generating corresponding bitstream index information items BSII and are assigned to, or stored in, that code buffer from which pictures Bs15, B14 and B16 have just been read before, i.e. code buffer #4. Next, picture B10 is decoded from code buffer #3 using pictures Bs11 and P9 and is displayed on-the-fly using corresponding bitstream index information items BSII.

Thereafter, picture Bs7 is taken from code buffer #2 and is decoded and stored in spare frame buffer 8 while decoded picture P9 is read from frame buffer 3 and displayed. Next, picture B8 is decoded from code buffer #2 using pictures P9 and Bs7 and is displayed on-the-fly using corresponding bitstream index information items BSII.

Thereafter, the data for picture P17-1 from the previous GOP are parsed/read from bitstream buffer BSBUF generating corresponding bitstream index information items BSII and are decoded using BSII and intermediately stored in frame buffer 3 while decoded picture Bs7 is read from frame buffer 8 and displayed, and while the data for pictures Bs15-1, B14-1 and B16-1 are parsed in bitstream buffer BSBUF generating corresponding bitstream index information items BSII and are assigned to, or stored in, that code buffer from which pictures Bs11, B10 and B12 have just been read before, i.e. code buffer #3. Next, picture B6 is decoded from code buffer #2 using pictures Bs7 and P5 and is displayed on-the-fly using corresponding bitstream index information items BSII. Thereafter, picture Bs3 is taken from code buffer #1 and is decoded and stored in spare frame buffer 8 while decoded picture P5 is read from frame buffer 2 and displayed. Next, picture B4 is decoded from code buffer #1 using pictures P5 and Bs3 and is displayed on-the-fly using corresponding bitstream index information items BSII.

Thereafter, the data for picture P21-1 from the previous GOP are parsed/read from bitstream buffer BSBUF generating corresponding bitstream index information items BSII and are decoded using BSII and intermediately stored in frame buffer 2 while decoded picture Bs3 is read from frame buffer 8 and displayed, and while the data for pictures Bs19-1, B18-1 and B20-1 are parsed in bitstream buffer BSBUF generating corresponding bitstream index information items BSII and are assigned to, or stored in, that code buffer from which pictures Bs7, B6 and B8 have just been read before, i.e. code buffer #2. Next, picture B2 is decoded from code buffer #1 using pictures Bs3 and I1 and is displayed on-the-fly using corresponding bitstream index information items BSII.

Thereafter, the data for picture P25-1 from the previous GOP are parsed/read from bitstream buffer BSBUF generating corresponding bitstream index information items BSII and are decoded using BSII and intermediately stored in Bs frame buffer 8 while decoded picture I1 is read from frame buffer 1 and displayed, and while the data for pictures Bs23-1, B22-1 and B24-1 are parsed in bitstream buffer BSBUF generating corresponding bitstream index information items BSII and are assigned to, or stored in, that code buffer from which pictures Bs3, B2 and B4 have just been read before, i.e. code buffer #1.

This kind of processing is repeated for the next GOP in backward direction (i.e. the previous GOP with respect to forward direction). However, because the anchor picture numbers, frame buffer numbers and the code buffer numbers have changed, the frame buffer numbers shown in columns 'show' and 'decode' and the code buffer numbers shown in column 'parse' are correspondingly re-ordered.

Figure 11A:
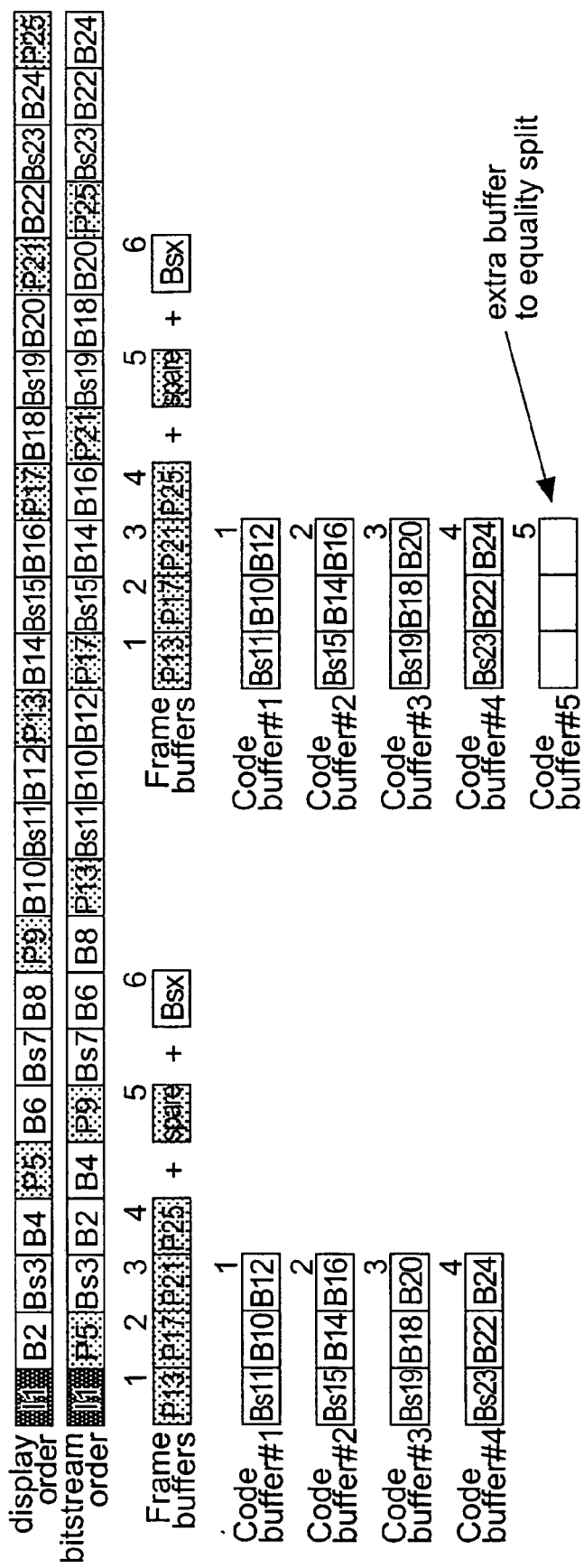
FIG. 11a the display and bitstream order of FIG. 10 but using a reduced set of frame buffers for I, P and Bs pictures for backwards decoding and reverse playback.
Figure 11A:
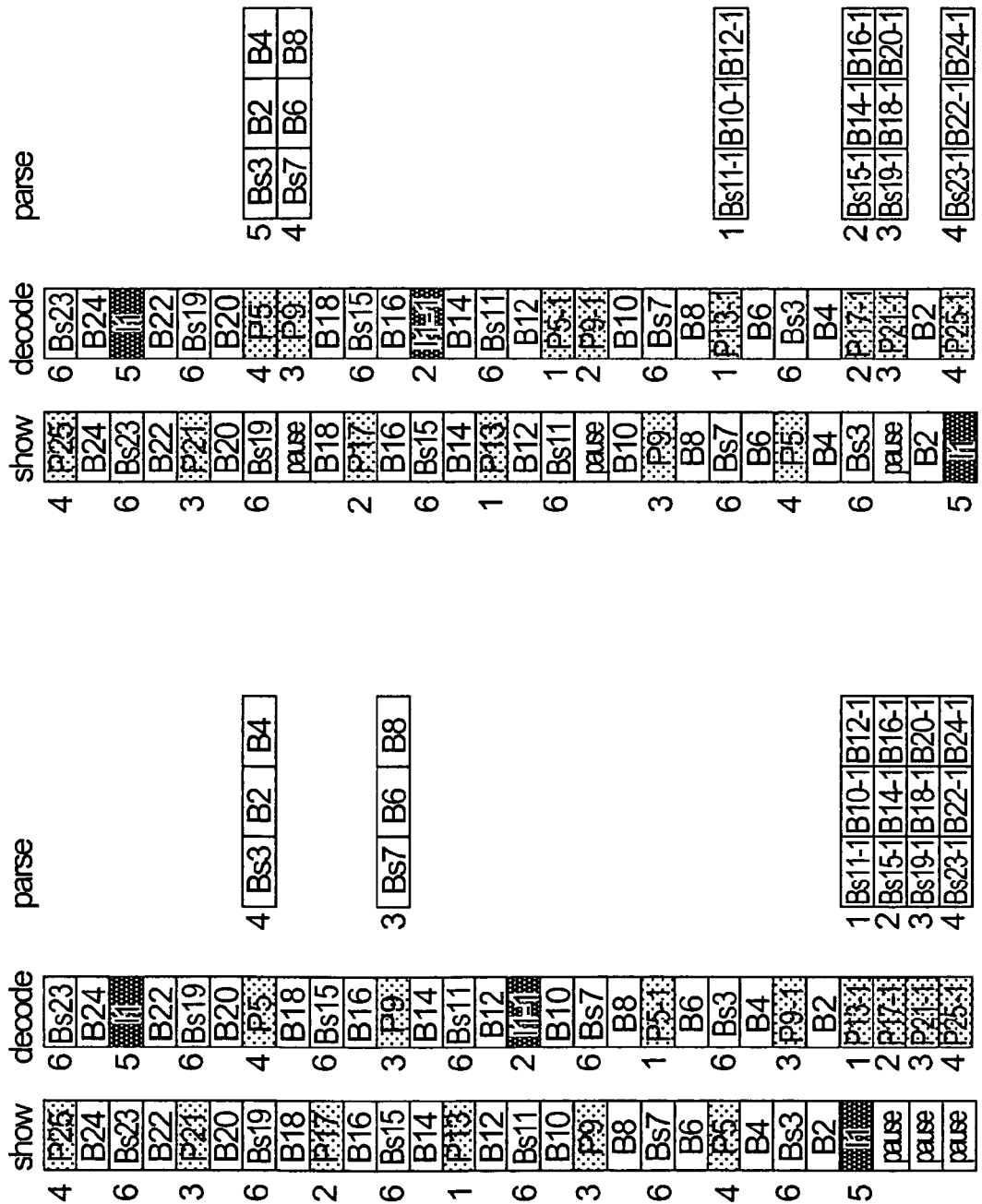
Figure 11B:
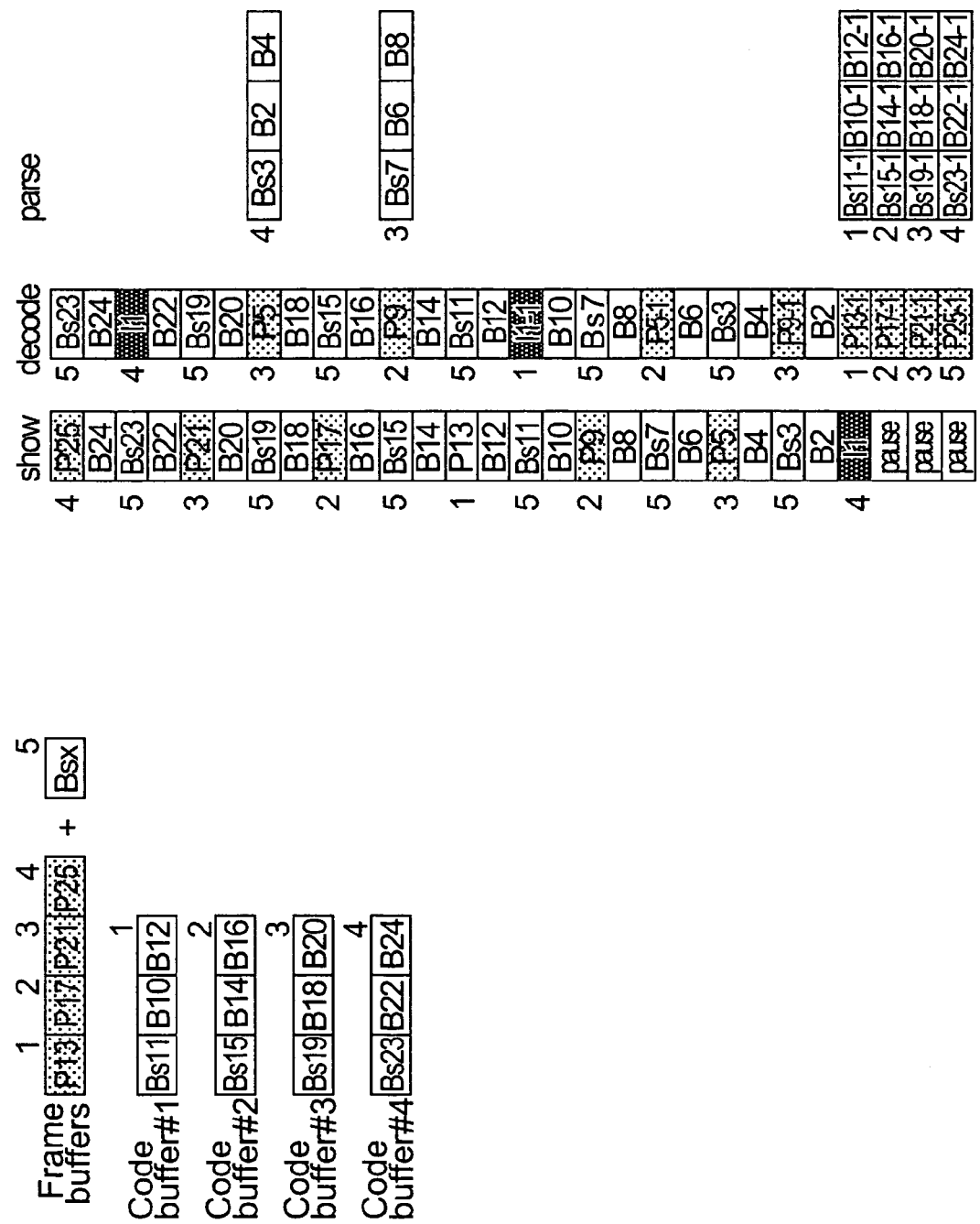
FIG. 11b the display and bitstream order of FIG. 10 and FIG. 11 but using an even smaller set of frame buffers than in FIG. 11 for I, P and Bs pictures for backwards decoding and reverse playback.

The MPEG-4-AVC GOP structure depicted in FIGS. 11a and 11b is identical to that of FIG. 10. However, the decoding is not carried out using a 'complete' set of frame buffers plus one spare buffer, but using instead a reduced set of frame buffers only (four in this example), plus one spare buffer and one Bs frame buffer in the embodiment according to FIG. 11a, or plus one Bs frame buffer only in the embodiment according to FIG. 11b.

The principle of the processing is similar to that according to the embodiments of FIG. 6 and FIG. 9 but due to the use of Bs pictures special features are to be considered. The advantage of splitting the unavoidable pause into several parts according to FIG. 11a in the right-hand columns can be achieved by using again at least as many frame buffers as is the integer value of one half of the total GOP anchor frames number. Advantageously, if according to FIG. 11a in the right-hand columns embodiment a further bitstream buffer (code buffer #5) is provided, the splitting of the pauses can be achieved in a homogeneous manner as an equidistant raster. In the embodiments according to FIG. 11 near real-time reverse playback can be achieved.

In FIG. 11a, left-hand columns, the decoding for the current GOP starts with decoding anchor pictures I1, P5, P9, P13, P17, P21 and P25 of the current GOP and storing anchor pictures P13, P17, P21 and P25 initially in the frame buffers 1 to 4 (FRBUF), respectively. These decoding steps are not depicted in the column 'decode', but would be arranged prior (i.e. above, in the drawing) to column 'decode'. The Bs picture buffer 6 is used for intermediately storing BS pictures only. The Bs pictures Bs11 to Bs23 and the B pictures B10 to B24 of the GOP are initially stored and parsed for generating the bitstream index information items BSII in corresponding code buffers #1 to #4, i.e. in identifiable areas of bit buffer BSBUF.

Thereafter, picture Bs23 is taken from code buffer #4 and is decoded and stored in Bs frame buffer 6 while decoded picture P25 is read from frame buffer 4 and displayed. Next, picture B24 is decoded from code buffer #4 using pictures P25 and Bs23 and is displayed on-the-fly using corresponding bitstream index information items BSII.

Thereafter, the data for picture I1 are parsed/read from bitstream buffer BSBUF generating (or using, because for I1, B2, Bs3, B4, P5, B6, Bs7, B8 and P9 belonging to the same GOP BSII can be used from a previous GOP parsing) corresponding bitstream index information items BSII and are decoded using BSII and intermediately stored in spare frame buffer 5 while decoded picture Bs23 is read from Bs frame buffer 6 and displayed. Next, picture B22 is decoded from code buffer #4 using pictures Bs23 and P21 and is displayed on-the-fly using corresponding bitstream index information items BSII.

Thereafter, picture Bs19 is taken from code buffer #3 and is decoded and stored in Bs frame buffer 6 while decoded picture P21 is read from frame buffer 3 and displayed. Next, picture B20 is decoded from code buffer #3 using pictures P21 and Bs19 and is displayed on-the-fly using corresponding bitstream index information items BSII.

Thereafter, the data for picture P5 are parsed/read from bitstream buffer BSBUF using or generating corresponding bitstream index information items BSII and are decoded using BSII and intermediately stored in frame buffer 4 while decoded picture Bs19 is read from Bs frame buffer 6 and displayed, and while the data for pictures Bs3, B2 and B4 are parsed in bitstream buffer BSBUF generating corresponding bitstream index information items BSII and are assigned to, or stored in, that code buffer from which pictures Bs23, B22 and B24 have just been read before, i.e. code buffer #4.

Next, picture B18 is decoded from code buffer #3 using pictures Bs19 and P17 and is displayed on-the-fly using corresponding bitstream index information items BSII.

Thereafter, picture Bs15 is taken from code buffer #2 and is decoded and stored in Bs frame buffer 6 while decoded picture P17 is read from frame buffer 2 and displayed. Next, picture B16 is decoded from code buffer #2 using pictures P17 and Bs15 and is displayed on-the-fly using corresponding bitstream index information items BSII.

Thereafter, the data for picture P9 are parsed/read from bitstream buffer BSBUF using or generating corresponding bitstream index information items BSII and are decoded using BSII and intermediately stored in frame buffer 3 while decoded picture Bs15 is read from Bs frame buffer 6 and displayed, and while the data for pictures Bs7, B6 and B8 are parsed in bitstream buffer BSBUF using or generating corresponding bitstream index information items BSII and are assigned to, or stored in, that code buffer from which pictures Bs19, B18 and B20 have just been read before, i.e. code buffer #3. Next, picture B14 is decoded from code buffer #2 using pictures Bs15 and P13 and is displayed on-the-fly using corresponding bitstream index information items BSII.

Thereafter, picture Bs11 is taken from code buffer #1 and is decoded and stored in Bs frame buffer 6 while decoded picture P13 is read from frame buffer 1 and displayed. Next, picture B12 is decoded from code buffer #1 using pictures P13 and Bs11 and is displayed on-the-fly using corresponding bitstream index information items BSII.

Thereafter, the data for picture I1-1 from the previous GOP (i.e. the next GOP in backward direction) are parsed/read from bitstream buffer BSBUF generating corresponding bitstream index information items BSII and are decoded using BSII and intermediately stored in frame buffer 2 while decoded picture Bs11 is read from Bs frame buffer 6 and displayed. Next, picture B10 is decoded from code buffer #1 using pictures Bs11 and P9 and is displayed on-the-fly using corresponding bitstream index information items BSII.

Thereafter, picture Bs7 is taken from code buffer #3 and is decoded and stored in Bs frame buffer 6 while decoded picture P9 is read from frame buffer 3 and displayed. Next, picture B8 is decoded from code buffer #3 using pictures P9 and Bs7 and is displayed on-the-fly using corresponding bitstream index information items BSII.

Thereafter, the data for picture P5-1 from the previous GOP are parsed/read from bitstream buffer BSBUF generating corresponding bitstream index information items BSII and are decoded using BSII and intermediately stored in frame buffer 1 while decoded picture Bs7 is read from Bs frame buffer 6 and displayed. Next, picture B6 is decoded from code buffer #3 using pictures Bs7 and P5 and is displayed on-the-fly. Thereafter, picture Bs3 is taken from code buffer #4 and is decoded and stored in Bs frame buffer 6 while decoded picture P5 is read from frame buffer 4 and displayed. Next, picture B4 is decoded from code buffer #4 using pictures P5 and Bs3 and is displayed on-the-fly using corresponding bitstream index information items BSII.

Thereafter, the data for picture P9-1 from the previous GOP are parsed/read from bitstream buffer BSBUF generating corresponding bitstream index information items BSII and are decoded using BSII and intermediately stored in frame buffer 3 while decoded picture Bs3 is read from Bs frame buffer 6 and displayed. Next, picture B2 is decoded from code buffer #4 using pictures Bs3 and I1 and is displayed on-the-fly using corresponding bitstream index information items BSII.

Thereafter, the data for picture P13-1 from the previous GOP are parsed/read from bitstream buffer BSBUF generating corresponding bitstream index information items BSII and are decoded using BSII and intermediately stored in frame buffer 1 while decoded picture I1 is read from spare frame buffer 5 and displayed, and while the data for pictures Bs11-1, B10-1 and B12-1 are parsed in bitstream buffer BSBUF generating corresponding bitstream index information items BSII and are assigned to, or stored in, code buffer #1.

Thereafter the data for picture P17-1 from the previous GOP are parsed/read from bitstream buffer BSBUF generating corresponding bitstream index information items BSII and are decoded using BSII and intermediately stored in frame buffer 2, while picture I1 is again read from spare frame buffer 5 and displayed, and while the data for pictures Bs15-1, B14-1 and B16-1 are parsed in bitstream buffer BSBUF generating corresponding bitstream index information items BSII and are assigned to, or stored in, code buffer #2.

Next, the data for picture P21-1 from the previous GOP are parsed/read from bitstream buffer BSBUF generating corresponding bitstream index information items BSII and are decoded using BSII and intermediately stored in frame buffer 3, while picture I1 is again read from spare frame buffer 5 and displayed, and while the data for pictures Bs19-1, B18-1 and B20-1 are parsed in bitstream buffer BSBUF generating corresponding bitstream index information items BSII and are assigned to, or stored in, code buffer #3.

Thereafter, the data for picture P25-1 from the previous GOP are parsed/read from bitstream buffer BSBUF generating corresponding bitstream index information items BSII and are decoded using BSII and intermediately stored in frame buffer 4, while picture I1 is again read from spare frame buffer 5 and displayed, and while the data for pictures Bs23-1, B22-1 and B24-1 are parsed in bitstream buffer BSBUF generating corresponding bitstream index information items BSII and are assigned to, or stored in, code buffer #4.

This kind of processing is repeated for the next GOP in backward direction (i.e. the previous GOP with respect to forward direction).

The processing scheme depicted in the three right-hand columns of FIG. 11a starts like that in the three left-hand columns of FIG. 11a until decoding of picture P5 and displaying picture Bs19. However, the data for pictures Bs3, B2 and B4 are assigned to, or stored in, an extra code buffer #5.

Next, picture Bs19 is again read from Bs frame buffer 6 and displayed while the data for picture P9 are parsed/read from bitstream buffer BSBUF generating (or using, because for B6, Bs7, B8, and P9 belonging to the same GOP BSII can be used from a previous GOP parsing) corresponding bitstream index information items BSII and are decoded using BSII and intermediately stored in frame buffer 3, and while the data for pictures Bs7, B6 and B8 are parsed in bitstream buffer BSBUF using or generating corresponding bitstream index information items BSII and are assigned to, or stored in, that code buffer from which pictures Bs23, B22 and B24 have been read before, i.e. code buffer #4. Next, picture B18 is decoded from code buffer #3 using pictures Bs19 and P17 and is displayed on-the-fly using corresponding bitstream index information items BSII.

Thereafter, picture Bs15 is taken from code buffer #2 and is decoded and stored in Bs frame buffer 6 while decoded picture P17 is read from frame buffer 2 and displayed. Next, picture B16 is decoded from code buffer #2 using pictures P17 and Bs15 and is displayed on-the-fly using corresponding bitstream index information items BSII.

Thereafter, the data for picture I1-1 are parsed/read from bitstream buffer BSBUF generating corresponding bitstream index information items BSII and are decoded using BSII and intermediately stored in frame buffer 2 while decoded picture Bs15 is read from Bs frame buffer 6 and displayed.

Next, picture B14 is decoded from code buffer #2 using pictures Bs15 and P13 and is displayed on-the-fly using corresponding bitstream index information items BSII.

Thereafter, picture Bs11 is taken from code buffer #1 and is decoded and stored in Bs frame buffer 6 while decoded picture P13 is read from frame buffer 1 and displayed. Next, picture B12 is decoded from code buffer #1 using pictures P13 and Bs11 and is displayed on-the-fly using corresponding bitstream index information items BSII.

Thereafter, the data for picture P5-1 from the previous GOP (i.e. the next GOP in backward direction) are parsed/read from bitstream buffer BSBUF generating corresponding bitstream index information items BSII and are decoded using BSII and intermediately stored in frame buffer 1 while decoded picture Bs11 is read from Bs frame buffer 6 and displayed. Next, the data for picture P9-1 from the previous GOP are parsed/read from bitstream buffer BSBUF generating corresponding bitstream index information items BSII and are decoded using BSII and intermediately stored in frame buffer 2, while picture Bs11 is again read from Bs frame buffer 6 and displayed. Next, picture B10 is decoded from code buffer #1 using pictures Bs11 and P9 and is displayed on-the-fly using corresponding bitstream index information items BSII.

Thereafter, picture Bs7 is taken from code buffer #4 and is decoded and stored in Bs frame buffer 6 while decoded picture P9 is read from frame buffer 3 and displayed. Next, picture B8 is decoded from code buffer #4 using pictures P9 and Bs7 and is displayed on-the-fly using corresponding bitstream index information items BSII.

Thereafter, the data for picture P13-1 from the previous GOP are parsed/read from bitstream buffer BSBUF generating corresponding bitstream index information items BSII and are decoded using BSII and intermediately stored in frame buffer 1 while decoded picture Bs7 is read from Bs frame buffer 6 and displayed, and while the data for pictures Bs11-1, B10-1 and B12-1 are parsed in bitstream buffer BSBUF generating corresponding bitstream index information items BSII and are assigned to, or stored in, code buffer #1. Next, picture B6 is decoded from code buffer #4 using pictures Bs7 and P5 and is displayed on-the-fly using corresponding bitstream index information items BSII.

Thereafter, picture Bs3 is taken from code buffer #5 and is decoded and stored in Bs frame buffer 6 while decoded picture P5 is read from frame buffer 4 and displayed. Next, picture B4 is decoded from code buffer #5 using pictures P5 and Bs3 and is displayed on-the-fly using corresponding bitstream index information items BSII.

Thereafter, the data for picture P17-1 from the previous GOP are parsed/read from bitstream buffer BSBUF generating corresponding bitstream index information items BSII and are decoded using BSII and intermediately stored in frame buffer 2 while decoded picture Bs3 is read from Bs frame buffer 6 and displayed, and while the data for pictures Bs15-1, B14-1 and B16-1 are parsed in bitstream buffer BSBUF generating corresponding bitstream index information items BSII and are assigned to, or stored in, code buffer #2. Next, the data for picture P21-1 from the previous GOP are parsed/read from bitstream buffer BSBUF generating corresponding bitstream index information items BSII and are decoded using BSII and intermediately stored in frame buffer 3, while picture Bs3 is again read from Bs frame buffer 6 and displayed, and while the data for pictures Bs19-1, B18-1 and B20-1 are parsed in bitstream buffer BSBUF generating corresponding bitstream index information items BSII and are assigned to, or stored in, code buffer #3. Next, picture B2 is decoded from code buffer #5 using pictures Bs3 and I1 and is displayed on-the-fly using corresponding bitstream index information items BSII.

Thereafter, the data for picture P25-1 from the previous GOP are parsed/read from bitstream buffer BSBUF generating corresponding bitstream index information items BSII and are decoded using BSII and intermediately stored in frame buffer 4 while decoded picture I1 is read from spare frame buffer 5 and displayed, and while the data for pictures Bs23-1, B22-1 and B24-1 are parsed in bitstream buffer BSBUF generating corresponding bitstream index information items BSII and are assigned to, or stored in, code buffer #4.

This kind of processing is repeated for the next GOP in backward direction (i.e. the previous GOP with respect to forward direction).

In the embodiment according to FIG. 11b no spare frame buffer is used. The decoding for a GOP starts with decoding anchor pictures I1, P5, P9, P13, P17, P21 and P25 of the current GOP and storing anchor pictures P13, P17, P21 and P25 initially in the frame buffers 1 to 4 (FRBUF), respectively. These decoding steps are not depicted in the column 'decode', but would be arranged prior (i.e. above, in the drawing) to column 'decode'. The Bs picture buffer 5 is used for intermediately storing BS pictures only. The Bs pictures Bs11 to Bs23 and the B pictures B10 to B24 of the GOP are initially stored and parsed for generating the bitstream index information items BSII in corresponding code buffers #1 to #4, i.e. in identifiable areas of bit buffer BSBUF.

Thereafter, picture Bs23 is taken from code buffer #4 and is decoded and stored in Bs frame buffer 5 while decoded picture P25 is read from frame buffer 4 and displayed. Next, picture B24 is decoded from code buffer #4 using pictures P25 and Bs23 and is displayed on-the-fly using corresponding bitstream index information items BSII.

Thereafter, the data for picture I1 are parsed/read from bitstream buffer BSBUF generating (or using, because for I1, B2, Bs3, B4, P5, B6, Bs7, B8 and P9 belonging to the same GOP BSII can be used from a previous GOP parsing) corresponding bitstream index information items BSII and are decoded using BSII and intermediately stored in frame buffer 4 while decoded picture Bs23 is read from Bs frame buffer 5 and displayed. Next, picture B22 is decoded from code buffer #4 using pictures Bs23 and P21 and is displayed on-the-fly using corresponding bitstream index information items BSII.

Thereafter, picture Bs19 is taken from code buffer #3 and is decoded and stored in Bs frame buffer 5 while decoded picture P21 is read from frame buffer 3 and displayed. Next, picture B20 is decoded from code buffer #3 using pictures P21 and Bs19 and is displayed on-the-fly using corresponding bitstream index information items BSII.

Thereafter, the data for picture P5 are parsed/read from bitstream buffer BSBUF using or generating corresponding bitstream index information items BSII and are decoded using BSII and intermediately stored in frame buffer 3 while decoded picture Bs19 is read from Bs frame buffer 5 and displayed, and while the data for pictures Bs3, B2 and B4 are parsed in bitstream buffer BSBUF using or generating corresponding bitstream index information items BSII and are assigned to, or stored in, that code buffer from which pictures Bs23, B22 and B24 have just been read before, i.e. code buffer #4. Next, picture B18 is decoded from code buffer #3 using pictures Bs19 and P17 and is displayed on-the-fly using corresponding bitstream index information items BSII.

Thereafter, picture Bs15 is taken from code buffer #2 and is decoded and stored in Bs frame buffer 5 while decoded picture P17 is read from frame buffer 2 and displayed. Next, picture B16 is decoded from code buffer #2 using pictures P17 and Bs15 and is displayed on-the-fly using corresponding bitstream index information items BSII.

Thereafter, the data for picture P9 are parsed/read from bitstream buffer BSBUF using or generating corresponding bitstream index information items BSII and are decoded using BSII and intermediately stored in frame buffer 2 while decoded picture Bs15 is read from Bs frame buffer 5 and displayed, and while the data for pictures Bs7, B6 and B8 are parsed in bitstream buffer BSBUF using or generating corresponding bitstream index information items BSII and are assigned to, or stored in, that code buffer from which pictures Bs19, B18 and B20 have just been read before, i.e. code buffer #3. Next, picture B14 is decoded from code buffer #2 using pictures Bs15 and P13 and is displayed on-the-fly using corresponding bitstream index information items BSII.

Thereafter, picture Bs11 is taken from code buffer #1 and is decoded and stored in Bs frame buffer 5 while decoded picture P13 is read from frame buffer 1 and displayed. Next, picture B12 is decoded from code buffer #1 using pictures P13 and Bs11 and is displayed on-the-fly using corresponding bitstream index information items BSII.

Thereafter, the data for picture I1-1 from the previous GOP (i.e. the next GOP in backward direction) are parsed/read from bitstream buffer BSBUF generating corresponding bitstream index information items BSII and are decoded using BSII and intermediately stored in frame buffer 1 while decoded picture Bs11 is read from Bs frame buffer 5 and displayed. Next, picture B10 is decoded from code buffer #1 using pictures Bs11 and P9 and is displayed on-the-fly using corresponding bitstream index information items BSII.

Thereafter, picture Bs7 is taken from code buffer #3 and is decoded and stored in Bs frame buffer 5 while decoded picture P9 is read from frame buffer 2 and displayed. Next, picture B8 is decoded from code buffer #3 using pictures P9 and Bs7 and is displayed on-the-fly using corresponding bitstream index information items BSII.

Thereafter, the data for picture P5-1 from the previous GOP are parsed/read from bitstream buffer BSBUF generating corresponding bitstream index information items BSII and are decoded using BSII and intermediately stored in frame buffer 2 while decoded picture Bs7 is read from Bs frame buffer 5 and displayed. Next, picture B6 is decoded from code buffer #3 using pictures Bs7 and P5 and is displayed on-the-fly. Thereafter, picture Bs3 is taken from code buffer #4 and is decoded and stored in Bs frame buffer 5 while decoded picture P5 is read from frame buffer 3 and displayed. Next, picture B4 is decoded from code buffer #4 using pictures P5 and Bs3 and is displayed on-the-fly using corresponding bitstream index information items BSII.

Thereafter, the data for picture P9-1 from the previous GOP are parsed/read from bitstream buffer BSBUF generating corresponding bitstream index information items BSII and are decoded using BSII and intermediately stored in frame buffer 3 while decoded picture Bs3 is read from Bs frame buffer 5 and displayed. Next, picture B2 is decoded from code buffer #4 using pictures Bs3 and I1 and is displayed on-the-fly. Thereafter, the data for picture P13-1 from the previous GOP are parsed/read from bitstream buffer BSBUF generating corresponding bitstream index information items BSII and are decoded using BSII and intermediately stored in frame buffer 1 while decoded picture I1 is read from frame buffer 4 and displayed, and while the data for pictures Bs11-1, B10-1 and B12-1 are parsed in bitstream buffer BSBUF generating corresponding bitstream index information items BSII and are assigned to, or stored in, code buffer #1.

Thereafter the data for picture P17-1 from the previous GOP are parsed/read from bitstream buffer BSBUF generating corresponding bitstream index information items BSII and are decoded using BSII and intermediately stored in frame buffer 2, while picture I1 is again read from frame buffer 4 and displayed, and while the data for pictures Bs15-1, B14-1 and B16-1 are parsed in bitstream buffer BSBUF generating corresponding bitstream index information items BSII and are assigned to, or stored in, code buffer #2.

Next, the data for picture P21-1 from the previous GOP are parsed/read from bitstream buffer BSBUF generating corresponding bitstream index information items BSII and are decoded using BSII and intermediately stored in frame buffer 3, while picture I1 is again read from frame buffer 4 and displayed, and while the data for pictures Bs19-1, B18-1 and B20-1 are parsed in bitstream buffer BSBUF generating corresponding bitstream index information items BSII and are assigned to, or stored in, code buffer #3.

Thereafter, the data for picture P25-1 from the previous GOP are parsed/read from bitstream buffer BSBUF generating corresponding bitstream index information items BSII and are decoded using BSII and intermediately stored in Bs frame buffer 5, while picture I1 is again read from frame buffer 4 and displayed, and while the data for pictures Bs23-1, B22-1 and B24-1 are parsed in bitstream buffer BSBUF generating corresponding bitstream index information items BSII and are assigned to, or stored in, code buffer #4.

This kind of processing is repeated for the next GOP in backward direction (i.e. the previous GOP with respect to forward direction). However, because the anchor picture numbers/frame buffer numbers have changed, the frame buffer numbers shown in columns 'show' and 'decode' are correspondingly re-ordered.

Figure 12:
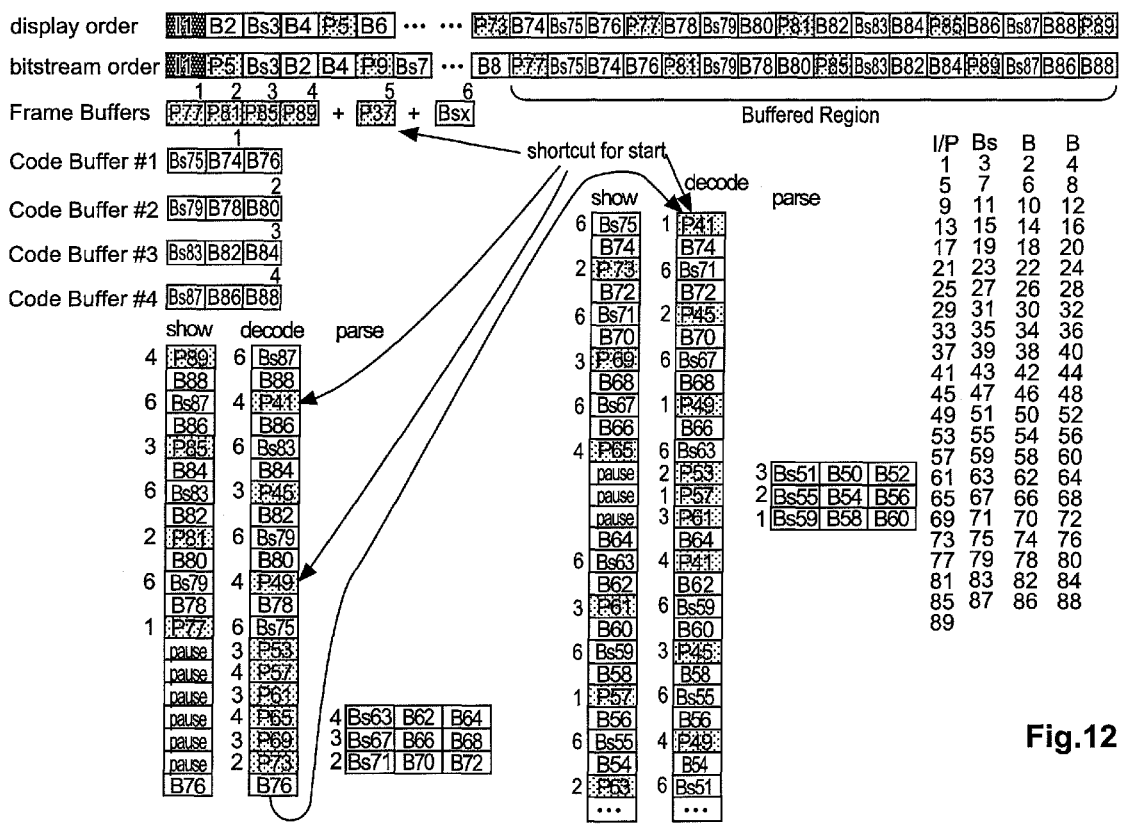

In FIG. 12 a long MPEG-4 AVC B-Stored GOP having 88 frames is depicted. A shortcut frame buffer like in FIG. 7 is used. By choosing a nifty or convenient anchor frame for storage in the shortcut buffer the necessary but unpleasant pause or pauses during reverse playback of a GOP can be shortened. The decoding for a GOP starts with decoding the anchor pictures of a current GOP and initially storing the anchor pictures P77, P81, P85 and P89 of an initially buffered region (B74 to P89) located at the end of the current GOP in the frame buffers 1 to 4 (FRBUF), respectively. This first or initial decoding through the GOP preferably includes the generation of corresponding bitstream index information items BSII for the whole GOP stored in buffer BSINDB. According to the invention, a decoded anchor frame (P37 in this example) located at about the middle of the GOP is thereby initially stored in an extra or short cut frame buffer 5. By making available such anchor frame the unavoidable and unpleasant pause or pauses while again decoding the required anchor frames (P41 to P73) for a buffered region (B58 to P73 in this example) adjacent to the initially buffered region can be shortened. This extra frame buffer facilitates a short cut because it allows to re-start decoding of the anchor frames of the GOP from that position instead of from the very beginning of the GOP. It is advantageous to fill the short cut frame buffer with a decoded picture of the GOP which is located at a position in GOP display time that is one half or about one half of the time period between the GOP start and the other buffered decoded anchor frames. The short cut frame buffer is initially filled during the initial or first anchor frame decoding through the GOP. When during the backward display process the short cut picture (P37) itself has been evaluated, another short cut frame buffer out of the available frame buffers can be generated again, selecting such an anchor frame for short cut that is located at or at about one half of the display time from the GOP start to the buffered anchor frames available, excluding the pictures of the GOP having already been displayed.

These decoding steps are not depicted in the column 'decode', but would be arranged prior (i.e. above, in the drawing) to column 'decode'. The Bs picture buffer 6 is used for intermediately storing Bs pictures only. The Bs pictures Bs75 to Bs87 and the B pictures B74 to B88 of the current GOP are initially stored in corresponding code buffers #1 to #4, i.e. in identifiable areas of bit buffer BSBUF.

Thereafter, picture Bs87 is taken from code buffer #4 and is decoded and stored in Bs frame buffer 6 while decoded picture P89 is read from frame buffer 4 and displayed. Next, picture B88 is decoded from code buffer #4 using pictures P89 and Bs87 and is displayed on-the-fly using corresponding bitstream index information items BSII.

Thereafter, the data for picture P41 are parsed/read from bitstream buffer BSBUF using corresponding bitstream index information items BSII and are decoded and intermediately stored in frame buffer 4 while decoded picture Bs87 is read from Bs frame buffer 6 and displayed. Next, picture B86 is decoded from code buffer #4 using pictures Bs87 and P85 and is displayed on-the-fly using corresponding bitstream index information items BSII.

Thereafter, picture Bs83 is taken from code buffer #3 and is decoded and stored in Bs frame buffer 6 while decoded picture P45 is read from frame buffer 3 and displayed. Next, picture B84 is decoded from code buffer #3 using pictures P85 and Bs83 and is displayed on-the-fly using corresponding bitstream index information items BSII.

Thereafter, the data for picture P45 are parsed/read from bitstream buffer BSBUF using corresponding bitstream index information items BSII and are decoded and intermediately stored in frame buffer 3 while decoded picture Bs83 is read from Bs frame buffer 6 and displayed. Next, picture B82 is decoded from code buffer #3 using pictures Bs83 and P81 and is displayed on-the-fly using corresponding bitstream index information items BSII.

Thereafter, picture Bs79 is taken from code buffer #2 and is decoded and stored in Bs frame buffer 6 while decoded picture P81 is read from frame buffer 2 and displayed. Next, picture B80 is decoded from code buffer #2 using pictures P81 and Bs79 and is displayed on-the-fly using corresponding bitstream index information items BSII.

Thereafter, the data for picture P49 are parsed/read from bitstream buffer BSBUF using corresponding bitstream index information items BSII and are decoded and intermediately stored in frame buffer 4 while the data for decoded picture Bs79 is read from Bs frame buffer 6 and displayed. Next, picture B78 is decoded from code buffer #2 using pictures Bs79 and P77 and is displayed on-the-fly using corresponding bitstream index information items BSII. Thereafter, picture Bs75 is taken from code buffer #1 and is decoded and stored in Bs frame buffer 6 while decoded picture P77 is read from frame buffer 1 and displayed.

After the lowest-index anchor frame P77 of the current buffered region has been displayed for the first time, it can be repeatedly displayed as a pause picture while the necessary anchor pictures for accessing the next GOP are decoded. The data for picture P53 are parsed/read from bitstream buffer BSBUF using corresponding bitstream index information items BSII and are decoded and intermediately stored in frame buffer 3 while picture P77 is again read from frame buffer 1 and displayed. The data for picture P57 are parsed/read from bitstream buffer BSBUF using corresponding bitstream index information items BSII and are decoded and intermediately stored in frame buffer 4 while picture P77 is again read from frame buffer 1 and displayed. The data for picture P61 are parsed/read from bitstream buffer BSBUF using corresponding bitstream index information items BSII and are decoded and intermediately stored in frame buffer 3 while picture P77 is again read from frame buffer 1 and displayed. The data for picture P65 are parsed/read from bitstream buffer BSBUF using corresponding bitstream index information items BSII and are decoded and intermediately stored in frame buffer 4 while picture P77 is again read from frame buffer 1 and displayed, and while the data for pictures Bs63, B62 and B64 are parsed in bitstream buffer BSBUF using corresponding bitstream index information items BSII and are assigned to, or stored in, that code buffer from which pictures Bs87, B86 and B88 have been read before, i.e. code buffer #4. The data for picture P69 are parsed/read from bitstream buffer BSBUF using corresponding bitstream index information items BSII and are decoded and intermediately stored in frame buffer 3 while picture P77 is again read from frame buffer 1 and displayed, and while the data for pictures Bs67, B66 and B68 are parsed in bitstream buffer BSBUF using corresponding bitstream index information items BSII and are assigned to, or stored in, that code buffer from which pictures Bs83, B82 and B84 have been read before, i.e. code buffer #3. The data for picture P73 are parsed/read from bitstream buffer BSBUF using corresponding bitstream index information items BSII and are decoded and intermediately stored in frame buffer 2 while picture P77 is again read from frame buffer 1 and displayed, and while the data for pictures Bs71, B70 and B72 are parsed in bitstream buffer BSBUF using corresponding bitstream index information items BSII and are assigned to, or stored in, that code buffer from which pictures Bs79, B78 and B80 have been read before, i.e. code buffer #2. Next, picture B76 is decoded from code buffer #1 using pictures P77 and Bs75 and is displayed on-the-fly using corresponding bitstream index information items BSII.

Thereafter, the data for picture P41 are parsed/read from bitstream buffer BSBUF using corresponding bitstream index information items BSII and are decoded and intermediately stored in frame buffer 1 while decoded picture Bs75 is read from Bs frame buffer 6 and displayed. Next, picture B74 is decoded from code buffer #1 using pictures Bs75 and P73 and is displayed on-the-fly using corresponding bitstream index information items BSII.

Thereafter, picture Bs71 is taken from code buffer #2 and is decoded and stored in Bs frame buffer 6 while decoded picture P73 is read from frame buffer 2 and displayed. Next, picture B72 is decoded from code buffer #2 using pictures P73 and Bs71 and is displayed on-the-fly using corresponding bitstream index information items BSII.

Thereafter, the data for picture P45 are parsed/read from bitstream buffer BSBUF using corresponding bitstream index information items BSII and are decoded and intermediately stored in frame buffer 2 while decoded picture Bs71 is read from Bs frame buffer 6 and displayed. Next, picture B70 is decoded from code buffer #2 using pictures Bs71 and P69 and is displayed on-the-fly using corresponding bitstream index information items BSII.

Thereafter, picture Bs67 is taken from code buffer #3 and is decoded and stored in Bs frame buffer 6 while decoded picture P69 is read from frame buffer 3 and displayed. Next, picture B68 is decoded from code buffer #3 using pictures P69 and Bs67 and is displayed on-the-fly using corresponding bitstream index information items BSII.

Thereafter, the data for picture P49 are parsed/read from bitstream buffer BSBUF using corresponding bitstream index information items BSII and are decoded and intermediately stored in frame buffer 1 while decoded picture Bs67 is read from Bs frame buffer 6 and displayed. Next, picture B66 is decoded from code buffer #3 using pictures Bs67 and P65 and is displayed on-the-fly using corresponding bitstream index information items BSII.

Thereafter, picture Bs63 is taken from code buffer #4 and is decoded and stored in Bs frame buffer 6 while decoded picture P65 is read from frame buffer 4 and displayed.

Next, the data for picture P53 are parsed/read from bitstream buffer BSBUF using corresponding bitstream index information items BSII and are decoded and intermediately stored in frame buffer 2 while picture P65 is again read from frame buffer 4 and displayed, and while the data for pictures Bs51, B50 and B52 are parsed in bitstream buffer BSBUF using corresponding bitstream index information items BSII and are assigned to, or stored in, that code buffer from which pictures Bs67, B66 and B68 have been read before, i.e. code buffer #3.

Thereafter, the data for picture P57 are parsed/read from bitstream buffer BSBUF using corresponding bitstream index information items BSII and are decoded and intermediately stored in frame buffer 1 while picture P65 is again read from frame buffer 4 and displayed, and while the data for pictures Bs55, B54 and B56 are parsed in bitstream buffer BSBUF using corresponding bitstream index information items BSII and are assigned to, or stored in, code buffer #2.

Next, the data for picture P61 are parsed/read from bitstream buffer BSBUF using corresponding bitstream index information items BSII and are decoded and intermediately stored in frame buffer 3 while picture P65 is again read from frame buffer 4 and displayed, and while the data for pictures Bs59, B58 and B60 are parsed in bitstream buffer BSBUF using corresponding bitstream index information items BSII and are assigned to, or stored in, code buffer #1. Then picture B64 is decoded from code buffer #4 using pictures P65 and Bs63 and is displayed on-the-fly using corresponding bitstream index information items BSII.

Thereafter, the data for picture P41 are parsed/read from bitstream buffer BSBUF using corresponding bitstream index information items BSII and are decoded and intermediately stored in frame buffer 4 while decoded picture Bs63 is read from Bs frame buffer 6 and displayed. Next, picture B62 is decoded from code buffer #4 using pictures Bs63 and P61 and is displayed on-the-fly using corresponding bitstream index information items BSII.

Thereafter, picture Bs59 is taken from code buffer #1 and is decoded and stored in Bs frame buffer 6 while decoded picture P61 is read from frame buffer 3 and displayed. Next, picture B60 is decoded from code buffer #1 using pictures P61 and Bs59 and is displayed on-the-fly using corresponding bitstream index information items BSII.

Thereafter, the data for picture P45 are parsed/read from bitstream buffer BSBUF using corresponding bitstream index information items BSII and are decoded and intermediately stored in frame buffer 3 while decoded picture Bs59 is read from Bs frame buffer 6 and displayed. Next, picture B58 is decoded from code buffer #1 using pictures Bs59 and P57 and is displayed on-the-fly using corresponding bitstream index information items BSII.

Thereafter, picture Bs55 is taken from code buffer #2 and is decoded and stored in Bs frame buffer 6 while decoded picture P57 is read from frame buffer 1 and displayed. Next, picture B56 is decoded from code buffer #2 using pictures P57 and Bs55 and is displayed on-the-fly using corresponding bitstream index information items BSII.

Thereafter, the data for picture P49 are parsed/read from bitstream buffer BSBUF using corresponding bitstream index information items BSII and are decoded and intermediately stored in frame buffer 4 while decoded picture Bs55 is read from Bs frame buffer 6 and displayed. Next, picture B54 is decoded from code buffer #2 using pictures Bs55 and P53 and is displayed on-the-fly using corresponding bitstream index information items BSII.

Thereafter, picture Bs51 is taken from code buffer #3 and is decoded and stored in Bs frame buffer 6 while decoded picture P53 is read from frame buffer 2 and displayed. This kind of processing is repeated correspondingly for the following buffered regions in backward direction. However, because the anchor picture numbers, frame buffer numbers and the code buffer numbers have changed, the frame buffer numbers shown in columns 'show' and 'decode' and the code buffer numbers shown in column 'parse' are correspondingly re-ordered.

The frame buffer, spare frame buffer, Bs frame buffer and code buffer numbers given with respect to the type of data stored therein, or read from them, are examples and can be re-numbered as desired.

The invention can be used for reverse playback of digital video data arranged in any GOP structure similar to that of MPEG video, for example for video sequences stored on Blu-ray ROM or RAM discs or on DVD discs.

What is claimed is:

1. Method for decoding encoded groups of pictures denoted GOP of a video sequence and presenting or displaying said video sequence and said GOPs in temporally backward direction,
    wherein each GOP includes anchor pictures serving for prediction of other pictures and interspersed non-anchor pictures not serving for prediction of other pictures,
    and wherein decoding of a current one of said GOPs starts with decoding anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said method including the steps:
    initially storing only a group of last decoded anchor pictures of the first GOP in dedicated picture buffers and starting presentation or display of said current GOP using said initially stored decoded anchor pictures and the corresponding interspersed non-anchor pictures, wherein the total number of such dedicated picture buffers is less than the total number of anchor pictures per GOP, and wherein a specific one of said decoded anchor pictures of said current GOP is intermediately stored in a dedicated picture buffer that is not overwritten by any other decoded anchor picture of said current GOP, said specific anchor picture being located at a position in GOP display time that is one half or about one half of the time period between the start of the current GOP and said group of last decoded anchor pictures, and said specific decoded anchor picture is used at least once per GOP for re-start of decoding of anchor pictures of the GOP from that position instead of from the very beginning of the GOP;
    continuing, until arrival at the beginning of said current GOP, the presentation or display of the remaining pictures of said current GOP using remaining ones of decoded anchor pictures intermediately stored in said dedicated picture buffers and using the corresponding interspersed non-anchor pictures, thereby repeating at least once the presentation or display of at least two of said decoded anchor pictures of said current GOP, in order to make available decoding processing time for repeatedly decoding those anchor pictures of said current GOP which do not belong to said group of last decoded anchor pictures of said current group of picture,
    and wherein said presentation or display of a current GOP is carried out such that when finalizing it the corresponding decoded anchor pictures for the following GOP to be presented or displayed are again stored in said dedicated picture buffers.

2. Method according to claim 1 wherein, when during the backward presentation or display processing said specific anchor picture itself has been evaluated, another specific anchor picture is stored in a dedicated picture buffer, said another specific anchor picture being located at or at about one half of the display time from the GOP start to the currently buffered anchor pictures, excluding the pictures of said current GOP having already been presented or displayed.

3. Method according to claim 1, wherein said video sequence includes anchor pictures which are MPEG4-AVC B-Stored pictures.

4. Apparatus for decoding encoded groups of pictures denoted GOP of a video sequence and presenting or displaying said video sequence and said GOPs in temporally backward direction,
    wherein each GOP includes anchor pictures serving for prediction of other pictures and interspersed non-anchor pictures not serving for prediction of other pictures,
    and wherein decoding of a current one of said GOPs starts with decoding anchor pictures of said current GOP from its beginning but the presentation or display of all the pictures of said current GOP starts with presenting or displaying the pictures of said current GOP from its end and continues until its beginning, whereby the non-anchor pictures are decoded from a bit buffer on-the-fly using the corresponding adjacent ones of said stored decoded anchor pictures, said apparatus including means being adapted for:
    initially storing only a group of last decoded anchor pictures of the first GOP in dedicated picture buffers and starting presentation or display of said current GOP using said initially stored decoded anchor pictures and the corresponding interspersed non-anchor pictures, wherein the total number of such dedicated picture buffers is less than the total number of anchor pictures per GOP, and wherein a specific one of said decoded anchor pictures of said current GOP is intermediately stored in a dedicated picture buffer that is not overwritten by any other decoded anchor picture of said current GOP, said specific anchor picture being located at a position in GOP display time that is one half or about one half of the time period between the start of the current GOP and said group of last decoded anchor pictures, and said specific decoded anchor picture is used at least once per GOP for re-start of decoding of anchor pictures of the GOP from that position instead of from the very beginning of the GOP;

continuing, until arrival at the beginning of said current GOP, the presentation or display of the remaining pictures of said current GOP using remaining ones of decoded anchor pictures intermediately stored in said dedicated picture buffers and using the corresponding interspersed non-anchor pictures, thereby repeating at least once the presentation or display of at least two of said decoded anchor pictures of said current GOP, in order to make available decoding processing time for repeatedly decoding those anchor pictures of said current GOP which do not belong to said group of last decoded anchor pictures of said current group of picture, and wherein said presentation or display of a current GOP is carried out such that when finalizing it the corresponding decoded anchor pictures for the following GOP to be presented or displayed are again stored in said dedicated picture buffers.

5. Apparatus according to claim 4 wherein, when during the backward presentation or display processing said specific anchor picture itself has been evaluated, another specific anchor picture is stored in a dedicated picture buffer, said another specific anchor picture being located at or at about one half of the display time from the GOP start to the currently buffered anchor pictures, excluding the pictures of said current GOP having already been presented or displayed.

6. Apparatus according to claim 4, wherein said video sequence includes anchor pictures which are MPEG4-AVC B-Stored pictures.

* * * * *